US011674422B2

(12) United States Patent
Norris et al.

(10) Patent No.: US 11,674,422 B2
(45) Date of Patent: Jun. 13, 2023

(54) SYSTEM AND METHOD FOR CONTROLLING TEMPERATURE OF EXHAUST GAS AT INLET OF SELECTIVE CATALYTIC REDUCTION SYSTEM

(71) Applicant: CUMMINS EMISSION SOLUTIONS INC., Columbus, IN (US)

(72) Inventors: Colin L. Norris, Columbus, IN (US); Bryon D. Staebler, Columbus, IN (US); Jeffrey Diwakar Abraham, Columbus, IN (US); Thomas R. Nelson, Greenwood, IN (US); Santhosh Kumar Pettem, Columbus, IN (US); Dylan Lawrence Schneider, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 17/707,072

(22) Filed: Mar. 29, 2022

(65) Prior Publication Data
US 2022/0316377 A1 Oct. 6, 2022

Related U.S. Application Data

(60) Provisional application No. 63/168,387, filed on Mar. 31, 2021.

(51) Int. Cl.
*F01N 3/20* (2006.01)
*F01N 3/10* (2006.01)
(Continued)

(52) U.S. Cl.
CPC ......... *F01N 3/2013* (2013.01); *F01N 3/0253* (2013.01); *F01N 3/106* (2013.01);
(Continued)

(58) Field of Classification Search
CPC ...... F01N 3/2013; F01N 3/0253; F01N 3/106; F01N 3/2066; F01N 3/0814; F01N 9/00;
(Continued)

(56) References Cited

U.S. PATENT DOCUMENTS 9,388,722 B2 * 7/2016 Gonze .................. F01N 3/2066
10,288,017 B1 * 5/2019 Romanato ............. F02M 26/47
(Continued)

FOREIGN PATENT DOCUMENTS

EP 3 943 719 A1 1/2022
GB 2 548 931 A 10/2017
(Continued)

OTHER PUBLICATIONS

Bresch-Pietri, Delphine, et al. "Control-oriented time-varying input-delayed temperature model for SI engine exhaust catalyst" 2013 American Control Conference (ACC '13) Jun. 17-19, 2013. 2189-2195. (Year: 2013).
(Continued)

*Primary Examiner* — Audrey B. Walter
*Assistant Examiner* — Dapinder Singh
(74) *Attorney, Agent, or Firm* — Foley & Lardner LLP

(57) ABSTRACT

An aftertreatment system includes a selective catalytic reduction (SCR) system, a heater, and a controller that determines a rise in temperature of exhaust gas at an outlet of the heater for a plurality of power levels, predicts a first temperature of the exhaust gas at the outlet of the heater based on the rise in temperature, predicts a second temperature of the exhaust gas at a location of the SCR system based on the first temperature, compares the second temperature for each of the plurality of power levels with a target temperature of the exhaust gas at the inlet of the SCR system, selects one of the plurality of power levels based on the comparison, and adjusts operation of the heater based on
(Continued)

the selected one of the plurality of power levels to achieve the target temperature of the exhaust gas at the inlet of the SCR system.

13 Claims, 12 Drawing Sheets

(51) Int. Cl.
  *F01N 3/02* (2006.01)
  *F01N 3/025* (2006.01)
(52) U.S. Cl.
  CPC ........ *F01N 3/2066* (2013.01); *F01N 2240/16* (2013.01); *F01N 2900/0408* (2013.01); *F01N 2900/0411* (2013.01); *F01N 2900/0601* (2013.01); *F01N 2900/0602* (2013.01); *F01N 2900/1404* (2013.01)
(58) Field of Classification Search
  CPC ............... F01N 13/009; F01N 2240/16; F01N 2900/0408; F01N 2900/0811; F01N 2900/0601; F01N 2900/0602; F01N 2900/1602; F01N 2900/1404; Y02T 10/12; Y02T 10/40
  See application file for complete search history.

(56) References Cited

U.S. PATENT DOCUMENTS

| | | | |
|---|---|---|---|
| 2007/0028625 A1* | 2/2007 | Joshi | F23R 3/40 60/777 |
| 2012/0324868 A1* | 12/2012 | Kim | B60W 10/30 60/274 |
| 2014/0026544 A1* | 1/2014 | Gonze | F01N 9/00 60/284 |
| 2015/0113947 A1 | 4/2015 | Ancimer et al. | |
| 2019/0155230 A1* | 5/2019 | Culbertson | F01N 3/208 |

FOREIGN PATENT DOCUMENTS

| | | |
|---|---|---|
| WO | WO-2012/092974 A1 | 7/2012 |
| WO | WO-2016/200320 A1 | 12/2016 |

OTHER PUBLICATIONS

Combined Search and Examination Report issued for UK Patent Application No. GB2204745.0 dated Aug. 26, 2022, 4 pages.

* cited by examiner

SYSTEM AND METHOD FOR CONTROLLING TEMPERATURE OF EXHAUST GAS AT INLET OF SELECTIVE CATALYTIC REDUCTION SYSTEM

CROSS-REFERENCE TO RELATED APPLICATIONS

This is a non-provisional claiming the benefit of U.S. Provisional Application No. 63/168,387, filed on Mar. 31, 2021, the entirety of which is incorporated by reference herein.

TECHNICAL FIELD

The present disclosure relates generally to aftertreatment systems for use with internal combustion engines.

BACKGROUND

An exhaust aftertreatment system is used to treat exhaust gas generated by an internal combustion engine. The exhaust aftertreatment system typically includes a selective catalytic reduction system that is formulated to reduce oxides of nitrogen in the exhaust gas in the presence of a catalyst and reductant. The exhaust aftertreatment system may also include one or more filters to remove debris and other particulates from the exhaust gas. By treating the exhaust gas using the exhaust aftertreatment system, the exhaust aftertreatment system reduces the levels of harmful emissions in the exhaust gas that would otherwise be emitted into the atmosphere. However, present day exhaust aftertreatment systems have limitations due to their configuration and the way they operate.

SUMMARY

In accordance with some aspects of the present disclosure, an aftertreatment system is disclosed. The aftertreatment system includes a selective catalytic reduction (SCR) system, a heater, and a controller having a processor programmed to execute computer-readable instructions stored in a memory to determine a rise in temperature of exhaust gas at an outlet of the heater for a plurality of power levels of the heater, predict a first temperature of the exhaust gas at the outlet of the heater based on the rise in temperature for each of the plurality of power levels, and predict a second temperature of the exhaust gas at a location of the SCR system based on the first temperature for each of the plurality of power levels. The location of the SCR system includes an inlet of the SCR system or a defined axial location of the SCR system. The processor also executes computer-readable instructions to compare the second temperature for each of the plurality of power levels with a target temperature of the exhaust gas at the location of the SCR system, select one of the plurality of power levels based on the comparison, and adjust operation of the heater based on the selected one of the plurality of power levels to achieve the target temperature of the exhaust gas at the location of the SCR system.

In accordance with some other aspects of the present disclosure, another aftertreatment system is disclosed. The aftertreatment system includes a selective catalytic reduction (SCR) system, a heater, and a controller having a processor programmed to execute computer-readable instructions stored in a memory to determine a first temperature of exhaust gas at a location of the SCR system. The location of the SCR system includes an inlet of the SCR system or a defined axial location of the SCR system. The processor also executes computer-readable instructions to determine a second temperature of the exhaust gas at an outlet of the heater, compare the first temperature with a target temperature of the exhaust gas at the location of the SCR system, and adjust operation of the heater based on the comparison and the second temperature to achieve the target temperature of the exhaust gas at the location of the SCR system.

In accordance with some other aspects of the present disclosure, another aftertreatment system is disclosed. The aftertreatment system includes a selective catalytic reduction (SCR) system, an oxidation catalyst, and a controller including a processor programmed to execute computer-readable instructions stored in a memory to determine a first temperature of exhaust gas at a location of the SCR system. The location of the SCR system includes an inlet of the SCR system or a defined axial location of the SCR system. The processor also executes computer-readable instructions to determine a second temperature of the exhaust gas at an outlet of the oxidation catalyst, compare the first temperature with a target temperature of the exhaust gas at the location of the SCR system, and insert hydrocarbon into the oxidation catalyst based on the comparison and the second temperature to achieve the target temperature of the exhaust gas at the location of the SCR system.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWINGS

The foregoing and other features of the present disclosure will become more fully apparent from the following description and appended claims taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

Figure 1:
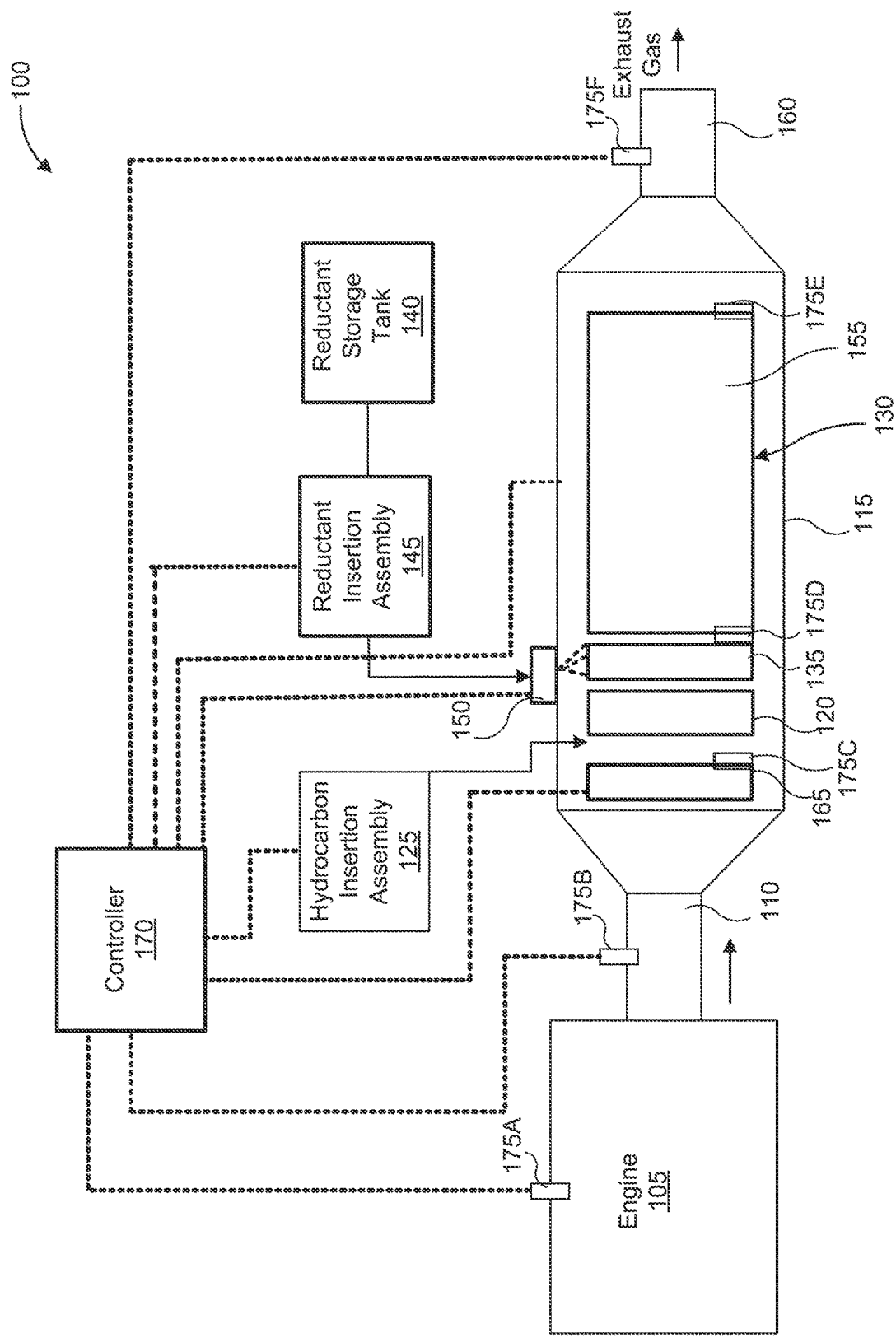
FIG. 1 is an example block diagram of an aftertreatment system, in accordance with some embodiments of the present disclosure.

Reference is made to the accompanying drawings throughout the following detailed description. In the drawings, similar symbols typically identify similar components unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

This application is directed to an aftertreatment system designed to treat exhaust gases emitted from an engine. The aftertreatment system may remove various types of undesirable constituents from the exhaust gas before releasing the treated exhaust gas into the atmosphere. The aftertreatment system may use a selective catalytic reduction ("SCR") system where the gaseous ammonia is catalyzed to reduce Nitrous Oxides ($NO_X$) in the exhaust gas. Specifically, SCR systems use an SCR catalyst that store ammonia to reduce the $NO_X$ that are produced by the engine. One example of an SCR catalyst is a Copper Zeolite (CuZe) catalyst. The CuZe catalyst may achieve a good de-$NO_X$ performance over a broad range of operating temperatures in a steady or equilibrium state. This equilibrium state may be determined by the operating temperature of the exhaust gas within the SCR system and the percentage of active sites of the SCR catalyst that have ammonia stored for the $NO_X$ conversion. If there is insufficient ammonia stored on the catalyst active sites, then the $NO_X$ reduction is suppressed until the SCR catalyst approaches the ammonia storage equilibrium. If the ammonia storage exceeds the maximum storage capacity the SCR catalyst at a particular operating temperature, then the excess ammonia storage may slip to cause excess emissions. The ammonia storage state in the SCR catalyst may vary with the axial and radial location of the active ammonia storage sites and may be impacted by factors such as inlet uniformity of ammonia and inlet gas, operating temperature of the SCR, and the ammonia dosing rate. An optimal $NO_X$ conversion efficiency of an SCR catalyst in equilibrium may be between 250° C. and 500° C.

The ammonia storage capacity of an SCR catalyst may also be impacted by factors including, but not limited to, thermal aging of the SCR catalyst, masking of SCR catalyst active sites, and storage of no ammonia compounds such as sulfur trioxide. Ammonia storage on the SCR catalyst may also be impacted by the temperature of the exhaust gas at the active sites. Generally speaking, the lower the temperature of the exhaust gas at the SCR catalyst active sites, the higher the ammonia storage. For example, in some embodiments, an SCR catalyst may have ammonia storage greater than 2 g/ltr at 200° C. down to about 0.1 g/ltr at 350° C. If the SCR catalyst experiences fast temperature swings (e.g., up to about 350° C.), the stored ammonia may be released, causing potential increased system out $NO_X$ and/or greater ammonia slip. As the temperature of the exhaust gas increases, the ammonia storage capacity decreases, but the $NO_X$ reduction increases. As the temperature of the exhaust gas decreases, the ammonia storage capacity increases, but the $NO_X$ reduction decreases. Therefore to maximize the $NO_X$ reduction capability and maximize ammonia storage, the temperature of the exhaust gas needs to be maintained at the SCR system within a narrow temperature band.

Thus, the present disclosure provides a controller that is configured to maintain the temperature of the exhaust gas at a target temperature at the inlet of the SCR system using a heater (e.g., an electric heater). In some embodiments, the controller may be a feedback controller (e.g., a proportional integral derivative controller or a relay hysteresis controller). In some embodiments, the heater may be located within the aftertreatment system in one of three potential locations: a) upstream or combined with a diesel oxidation catalyst of the aftertreatment system; b) upstream or combined with a diesel particulate filter catalyst of the aftertreatment system; or c) upstream or combined with a decomposition chamber of the aftertreatment system. The controller may monitor the temperature of the exhaust gas entering the aftertreatment system and the temperature of the exhaust gas downstream of the heater. Based on the measured temperatures, the controller may modulate the operation of the heater between 0% and 100% of the duty cycle to achieve a desired or target temperature of the exhaust gas at the inlet of the SCR system. In other words, the controller may adjust the power level of the heater based on the measured temperatures to achieve the target temperature. A feedback loop from the inlet of the SCR system may determine an error between the actual temperature of the exhaust gas at the inlet of the SCR system and the target temperature, and use the error value to adjust the operation of the heater. The inventors have found that a temperature between, 240° C. and 280° C., inclusive, in the front 0 to 6 inches of the SCR catalyst of the SCR system prevents excessive ammonia slip while attaining an optimal $NO_X$ reduction.

In some embodiments, the controller may be a feedforward controller. Unlike a feedback controller that measures the actual temperature of the exhaust gas at the inlet of the SCR system and varies the operation of the heater based on the actual temperature, the feedforward controller predicts the temperature of the exhaust gas at the inlet of the SCR system in the future for various power levels. The feedforward controller selects a power level for adjusting the operation of the heater to achieve the target temperature of the exhaust gas at the inlet of the SCR system By achieving and maintaining a target temperature of the exhaust gas at an inlet of the SCR system (whether by a feedback controller or a feedforward controller), the present disclosure ensures optimal $NO_X$ reduction while minimizing ammonia slip.

Referring now to FIG. 1, an example block diagram of an aftertreatment system 100 is shown, in accordance with some embodiments of the present disclosure. The aftertreatment system 100 is configured to receive exhaust gas from an engine 105. The engine 105 may be a compression ignited internal combustion engine such as a diesel engine, a spark-ignited internal combustion engine such as a gasoline engine, or any other types of engine such as a natural gas engine, a dual fuel engine, a biodiesel engine, an E-85 engine, etc. The engine 105 emits exhaust gas as a result of combustion of air from the atmosphere with fuel. The exhaust gas is discharged from the engine 105, via an inlet conduit 110, into a housing 115.

The housing 115 defines an internal volume within which one or more elements for treating the exhaust gas are disposed. To withstand the operating conditions, the housing 115 may be formed from a rigid, heat-resistant, and corrosion-resistant material such as stainless steel, iron, aluminum, metals, ceramics, or any other suitable material. Although the housing 115 has been shown in FIG. 1 as having a particular shape and size, the housing may have any suitable cross-section (e.g., circular, square, rectangular, oval, elliptical, polygonal, etc.) and any suitable size. The housing 115 may house an oxidation catalyst 120 for oxidizing nitric oxide and certain types of particulate matter from the exhaust gas, and decomposing unburnt hydrocarbons from the exhaust gas. In some embodiments, the oxidation catalyst 120 may be a diesel oxidation catalyst ("DOC") or other type of oxidation catalyst that is suitable for use in the aftertreatment system 100.

In some embodiments, the aftertreatment system 100 may be associated with a hydrocarbon insertion assembly 125 for selectively injecting a hydrocarbon (e.g., fuel) upstream of the oxidation catalyst 120. The oxidation catalyst 120 may catalyze ignition of the hydrocarbon so as to increase a temperature of the exhaust gas for regenerating the oxidation catalyst and/or regenerating other elements within the housing 115. In some embodiments, the aftertreatment system 100 may also include a particulate filter (not shown in FIG. 1) within the housing 115. The particulate filter may be disposed downstream or upstream of the oxidation catalyst 120. When positioned "upstream" of the oxidation catalyst 120, the particulate filter may be positioned between the inlet conduit 110 and the oxidation catalyst such that the exhaust gas exiting the particulate filter enters the oxidation catalyst. When positioned "downstream" of the oxidation catalyst 120, the particulate filter may be positioned between the oxidation catalyst and a selective catalytic reduction ("SCR") system 130 such that the exhaust gas exiting the oxidation catalyst enters the particulate filter. In some embodiments, particulate filters may be provided both upstream and downstream of the oxidation catalyst 120.

The particulate filter may be configured to remove particulate matter (e.g., soot, debris, inorganic particles, etc.) from the exhaust gas. The particulate filter may be any of a variety of filters that are suitable for use within the aftertreatment system 100. For example, in some embodiments, the particulate filter may be a diesel particulate filter ("DPF") having a ceramic filter (e.g. cordierite), and may be symmetric or asymmetric. In some embodiments, the particulate filter may be catalyzed. In some embodiments, the oxidation catalyst 120 and the particulate filter may be integrated into a single component.

The housing 115 may also include the SCR system 130 that is configured to reduce constituents such as oxides of nitrogen ($NO_X$) gases, carbon monoxide (CO) gases, hydrocarbons, etc. from the exhaust gas. The SCR system 130 may include or be associated with a decomposition chamber 135 that is configured to receive reductant from a reductant storage tank 140 via a reductant insertion assembly 145. A reductant port 150 may be positioned on a sidewall of the housing 115 to allow insertion of the reductant into an internal volume of the decomposition chamber 135. In some embodiments, the reductant port 150 may include a reductant injector that is configured to combine a flow of reductant received via the reductant port with compressed air, and deliver a stream or a jet of the reductant-air combination into the decomposition chamber 135. In some embodiments, the reductant injector may be a nozzle of a predetermined diameter. In other embodiments, other mechanisms may be used to selectively deliver the reductant into the decomposition chamber 135. Thus, the decomposition chamber 135 may be configured to receive exhaust gas and a reductant, and facilitate mixing of the exhaust gas with the reductant to form an exhaust gas-reductant mixture. In some embodiments, mixers, baffles, vanes, or other structures may be used in conjunction with the decomposition chamber 135 to further facilitate mixing of the reductant with the exhaust gas.

The decomposition chamber 135 may be structured to receive reductant in a variety of ways. For example, in some embodiments, the decomposition chamber 143 may be positioned upstream of the SCR system 130 to allow the reductant to be inserted, via the reductant port 150, into the decomposition chamber upstream of the SCR system. In other embodiments, the decomposition chamber 135 may be structured such that the reductant port 150 is configured to allow the reductant to be inserted directly into the SCR system 130. In yet other embodiments, the decomposition chamber 135 may be disposed in the inlet conduit 110. While the decomposition chamber 135 is shown to be downstream of the oxidation catalyst 120 in FIG. 1, the decomposition chamber may instead be located upstream of the oxidation catalyst, upstream or downstream of the DPF when present, and/or upstream of the SCR system 130.

The reductant that is injected into the decomposition chamber via the reductant port 150 may be stored within the reductant storage tank 140. The reductant facilitates decomposition of the constituents of the exhaust gas (e.g., $NO_X$ gases included in the exhaust gas). Any suitable reductant may be used depending upon the constituents of the exhaust gas. For example, in some embodiments, the exhaust gas may include a diesel exhaust gas and the reductant may include a diesel exhaust fluid (e.g., the diesel exhaust fluid marketed under the name ADBLUE®) such as urea, an aqueous solution of urea, or any other fluid that includes ammonia. When aqueous urea solution is used for the reductant, the solution may include a particular ratio of urea to water. For example, in some embodiments, the ratio may be 32.5% by volume of urea and 67.5% by volume of deionized water, 40% by volume of urea and 60% by volume of deionized water, or any other suitable ratio of urea to deionized water. The reductant from the reductant storage tank 140 may be selectively inserted into the decomposition chamber by the reductant insertion assembly 145. The reductant insertion assembly 145 may include various structures to facilitate receipt of the reductant from the reductant storage tank 140 and delivery to the reductant port 150. For example, the reductant insertion assembly 145 may include, or be associated with to control, various pumps, valves, screens, filters, etc. that facilitate receiving the reductant from the reductant storage tank 140 and supplying that reductant to the reductant port 150.

Further, in some embodiments, the reductant may be inserted into the decomposition chamber in liquid form or in gaseous form. In some embodiments, the reductant port 150, and particularly the reductant injector associated with the reductant port, may be configured to inject the reductant in liquid form. In such embodiments, the reductant port 150 may constitute or be part of a "wet doser" or "liquid doser." In other embodiments, a vaporizer may be associated with the reductant port 150, the reductant injector, and/or the reductant insertion assembly 145 to vaporize or convert the liquid reductant into gaseous form before insertion into the housing 115. Whether inserted in liquid form or gaseous form, upon being injected into the decomposition chamber, the reductant undergoes evaporation, thermolysis, and/or hydrolysis to form gaseous ammonia, which is then mixed with the exhaust gas to form the exhaust gas-reductant mixture. The exhaust gas-reductant mixture may then flow over an SCR catalyst 155 of the SCR system 130.

The SCR catalyst 155 may be formulated to decompose certain constituents in the exhaust gas using the gaseous ammonia as a reagent in the presence of the SCR catalyst. Specifically, the SCR catalyst 155 causes the gaseous ammonia in the exhaust gas to catalyze, thereby reducing the $NO_X$ in the exhaust gas during the oxidation reaction. In some embodiments, the SCR catalyst 155 may include a metal-zeolite catalyst including, but not limited to Cu-CHA-Zeolite (e.g., a Cu-SSZ-13 catalyst), but also other zeolite structures including Cu-SAPO-34 catalyst, Cu-LTA, Cu-AEI, Cu-ZSM, Cu-beta, Cu-Chabazite, or any other suitable catalyst. In other embodiments, the SCR catalyst 155 may include a vanadium, an iron-zeolite, or a copper/iron-zeolite catalyst. In still other embodiments, the SCR catalyst 155 may include a multi-zone catalyst, for example, having a first zone including a copper-zeolite catalyst, and a second zone including an iron-zeolite catalyst, or vice versa. The SCR catalyst 155 may be disposed on a suitable substrate such as, for example, a ceramic (e.g., cordierite) or metallic (e.g., kanthal) monolith core which may, for example, define a honeycomb structure. In some embodiments, a washcoat may also be used as a carrier material for the SCR catalyst 155. Such washcoat materials may include, for example, aluminum oxide, titanium dioxide, silicon dioxide, any other suitable washcoat material, or a combination thereof. The monolith core may be securely positioned in a can to form the SCR system 130, which may be installed in the aftertreatment system 100. In some embodiments, the SCR system 130 may include a selective catalytic reduction filter (SCRF). The treated exhaust gas (e.g., treated to reduce constituents such as $NO_X$ gases, unburnt hydrocarbons, etc.) is expelled, via an outlet conduit 160, into the environment.

In some embodiments, a heater 165 may also be disposed within the housing 115. The heater 165 may be used to heat the exhaust gas to increase the efficiency of the aftertreatment system 100. For example, in some embodiments, the heater 165 may be used to achieve a desired or target temperature at the inlet of the SCR system 130. In some embodiments, the heater 165 may be an electric resistive heater. In other embodiments, the heater 165 may be another type of an electric heater or other type of heater. In yet other embodiments, the heater may include any device or mechanism that may be used for heating exhaust gas. In some embodiments, the heater 165 may be configured as a pulse width modulated heater in that pulse width modulation may be used to control the heater. In other embodiments, the heater 165 may be controlled in other ways. In some embodiments, the heater 165 may be a 10 kilowatt heater. In other embodiments, the heater 165 may be of other power capacities. In some embodiments, the rate of temperature rise of the exhaust gas passing through the heater 165 may be dependent upon the mass flow of the exhaust gas through the heater. In some embodiments, one or more heaters may be used for the heater 165.

Further, the positioning of the heater 165 may vary from one embodiment to another. For example, and as shown in FIG. 1, in some embodiments, the heater 165 may be positioned upstream of the oxidation catalyst 120. In some embodiments, the heater 165 may be combined with or cross-coupled with (e.g., combined with) the oxidation catalyst 120. In other embodiments, the heater 165 may be positioned downstream of the oxidation catalyst 120. For example, in some embodiments, and particularly those embodiments in which a DPF is provided, the heater 165 may be positioned between the oxidation catalyst 120 and the DPF. In other embodiments, the heater 165 may be positioned downstream of the DPF and upstream of the SCR system 130. In some embodiments, the heater 165 may be combined with or cross-coupled with the DPF. In yet other embodiments, the heater 165 may be positioned within or cross-coupled with (e.g., combined with) the SCR system 130. In yet other embodiments, the heater 165 may be positioned within or cross-coupled with (e.g., combined with) the decomposition chamber 135, positioned upstream of the decomposition chamber, or positioned downstream of the decomposition chamber. Thus, in some embodiments, the heater 165 may be positioned in one of 3 potential locations: upstream or combined with the oxidation catalyst 120; upstream or combined with the DPF; or upstream or combined with the decomposition chamber 135. In other embodiments, the location of the heater 165 may vary as desired to control the inlet temperature of the exhaust gas at the inlet of the SCR system 130. Further, in some embodiments, more than one heater (e.g., the heater 165) located at different positons may be used.

Although the heater 165, oxidation catalyst 120, the particulate filter, the decomposition chamber 135, and the SCR system 130 have been described as being disposed within a single housing (e.g., the housing 115), in some embodiments, one or more of those components may be disposed in separate housings and connected together in operable association. Further, although a single instance of each of the heater 165, the oxidation catalyst 120, the particulate filter, the decomposition chamber 135, and the SCR system 130 has been described, in some embodiments, multiple instances of one or more of those elements may be provided within the aftertreatment system 100, if suitable.

Referring still to FIG. 1, the aftertreatment system 100 also includes a controller 170 that is configured to control operation of the various elements of the aftertreatment system 100 in treating the exhaust gas. For example, the controller 170 may be operably connected to the reductant insertion assembly 145 to instruct the reductant insertion assembly to selectively deliver the reductant from the reductant storage tank 140 to the reductant port 150. The controller 170 may also be operably connected to the reductant port 150 to selectively operate the reductant port to insert the reductant received from the reductant storage tank 140 into the decomposition chamber 135. Thus, the controller 170 may control the dosing rate of the reductant via the reductant insertion assembly 145 and the reductant port 150.

The controller 170 may also be configured to control the hydrocarbon insertion assembly 125 to selectively insert hydrocarbons into the oxidation catalyst 120 (e.g., when regeneration of the oxidation catalyst 120 and/or the DPF is needed). In some embodiments, the selective insertion of hydrocarbons may also be used to increase the temperature of the exhaust gas. Thus, in some embodiments, the hydrocarbon insertion assembly 125 may be used in conjunction with the heater 165 to increase the temperature of the exhaust gas. The controller 170 may also control the operation of the heater 165, as discussed in greater detail below, to achieve a target temperature of the exhaust gas at the inlet of the SCR system 130. The controller 170 may likewise be connected to other elements of the aftertreatment system 100 that are controlled by the controller. The controller 170 may be operably coupled to the various components of the aftertreatment system 100 using any type and any number of wired and/or wireless connections. For example, in some embodiments, a wired connection such as a serial cable, a fiber optic cable, a CAT5 cable, etc. may be used to communicably connect the controller 170 to one or more elements of the aftertreatment system 100. In other embodiments, a wireless connection such as the Internet, Wi-Fi, cellular, radio, Bluetooth, ZigBee, etc. may be used. In some embodiments, a combination of wired and wireless connections may be used. Further, in some embodiments, a controller area network (CAN) bus may provide the exchange of signals, information, and/or data between the controller 170 and the various elements of the aftertreatment system 100.

The controller 170 may include or be associated with one or more processing units or processors. The processing unit(s) may include a microprocessor, programmable logic controller (PLC) chip, an application specific integrated circuit (ASIC), one or more field programmable gate arrays (FPGAs), a digital signal processor (DSP), a group of processing components, or other suitable electronic processing components. The processing unit(s) of the controller 170 may be configured to execute computer-readable instructions for performing the operations described herein. The processing unit(s) may be implemented in hardware, firmware, software, or any combination thereof "Executing a computer-readable instruction" means that the processing unit(s) may perform operation(s) called for by that instruction. The processing unit(s) may retrieve the instruction from a memory associated with the controller 170 for execution and copy the instruction in an executable form to a physical memory. In some embodiments, the processing unit(s) may be configured to execute the instruction without first copying the instruction to the physical memory. The instruction may be written using one or more programming languages, scripting languages, assembly languages, etc. Thus, the controller 170, via its associated processing unit(s), may be configured to execute instructions, algorithms, commands, or programs stored in the memory associated with the controller.

Although a single controller (e.g., the controller 170) configured to control multiple elements (e.g., the reductant insertion assembly 145, the hydrocarbon insertion assembly 125, the heater 165, etc.) of the aftertreatment system 100 is shown, in some embodiments, separate controllers for one or more of those elements may be used. The controller 170 may include or be associated with other hardware, software, and/or firmware components that may be needed or considered useful to have in performing the functions described herein. In some embodiments, the controller 170 may be part of an electronic control unit (ECU) of the aftertreatment system 100. The controller 170 may be configured to control the reductant insertion assembly 145, the hydrocarbon insertion assembly 125, the heater 165, and any other element of the aftertreatment system 100 that is controlled by the controller based on data received from one or more sensors, such as sensors 175A, 175B, 175C, 175D, 175E, and 175F.

Each of the sensors 175A-175F may be configured to measure one or more conditions. For example, in some embodiments, the sensor 175A may be positioned within the engine and configured to measure one or more engine parameters (e.g., engine speed, engine temperature, etc.). The sensor 175B may be positioned within the inlet conduit 110 to measure one or more parameters in the exhaust gas flowing through the inlet conduit, the sensor 175C may be configured to measure one or more parameters in the exhaust gas downstream (e.g., at the outlet) of the heater 165, the sensors 175D and 175E may be configured to measure one or more parameters at the inlet and outlet, respectively, of the SCR system 130, while the sensor 175F may be configured to measure one or more parameters in the exhaust gas flowing through the outlet conduit 160.

In some embodiments, one or more of the sensors 175A-175F may include a $NO_X$ sensor configured to measure an amount of $NO_X$ gases in the exhaust gas. In other embodiments, one or more of the sensors 175A-175F may include a temperature sensor to measure the temperature of the exhaust gas. In yet other embodiments, one or more of the sensor 175A-175F may include a pressure sensor, an oxygen sensor, a particulate matter sensor, ammonia (e.g., to determine ammonia slip), or any other sensor to measure a parameter that may be needed or considered desirable for the controller 170 to have in controlling the various elements of the aftertreatment system 100, and for achieving the target temperature at the inlet of the SCR system 130. Further, although a single sensor (e.g., the sensors 175A-175F) is shown in the various locations, in some embodiments, multiple sensors may be positioned at those locations. Further, in some embodiments, each of the sensors 175A-175F may be configured to measure a single parameter (e.g., temperature, $NO_X$ amount, etc.), while in other embodiments, each of those sensors may be configured to measure multiple parameters. Additionally, each of the sensor 175A-175F may be a physical sensor (e.g., a hardware device such as a thermistor) or a virtual sensor (e.g., based on a software model to determine the value of the parameter that the sensor is configured to measure).

Although the sensors 175A-175F have been shown in the aftertreatment system 100 as being positioned in specific locations, the positioning of those sensors may vary as suitable. For example, although the sensor 175C has been shown as being mounted at the outlet of the heater 165C, in some embodiments, that sensor may be positioned anywhere between the outlet of the heater and the inlet of the oxidation catalyst 120. Similarly, although the sensor 175D has been shown as being mounted at the inlet of the SCR system 130, in some embodiments, that sensor may be mounted within the SCR system, at the outlet of the decomposition chamber 135, or anywhere between the outlet of the decomposition chamber and the inlet of the SCR system. Similarly, the location of the other sensors may vary. Moreover, although only the sensors 175A-175F have been shown in FIG. 1, in other embodiments, additional sensors may be mounted in other locations as desired to enable the controller 170 to perform the functions described herein. Each of the sensors 175A-175F may be configured to collect data and transmit that data to the controller 170. Based on the collected data, the controller 170 may then control operation of the aftertreatment system 100.

Although certain components of the aftertreatment system 100 are shown and described in FIG. 1, the aftertreatment system may include other or additional elements that may be suitable. For example, in some embodiments, the aftertreatment system 100 may include an ammonia slip catalyst ("ASC") or ammonia oxidation catalyst ("AMOx") to reduce ammonia slip by which ammonia that is not catalyzed by the SCR catalyst 155 may be decomposed. In some embodiments, the aftertreatment system 100 may include mixers, baffle plates, secondary filters (e.g., a secondary partial flow or catalyzed filter), or any other component that may be needed or considered desirable in properly operating the aftertreatment system 100.

Figure 2:
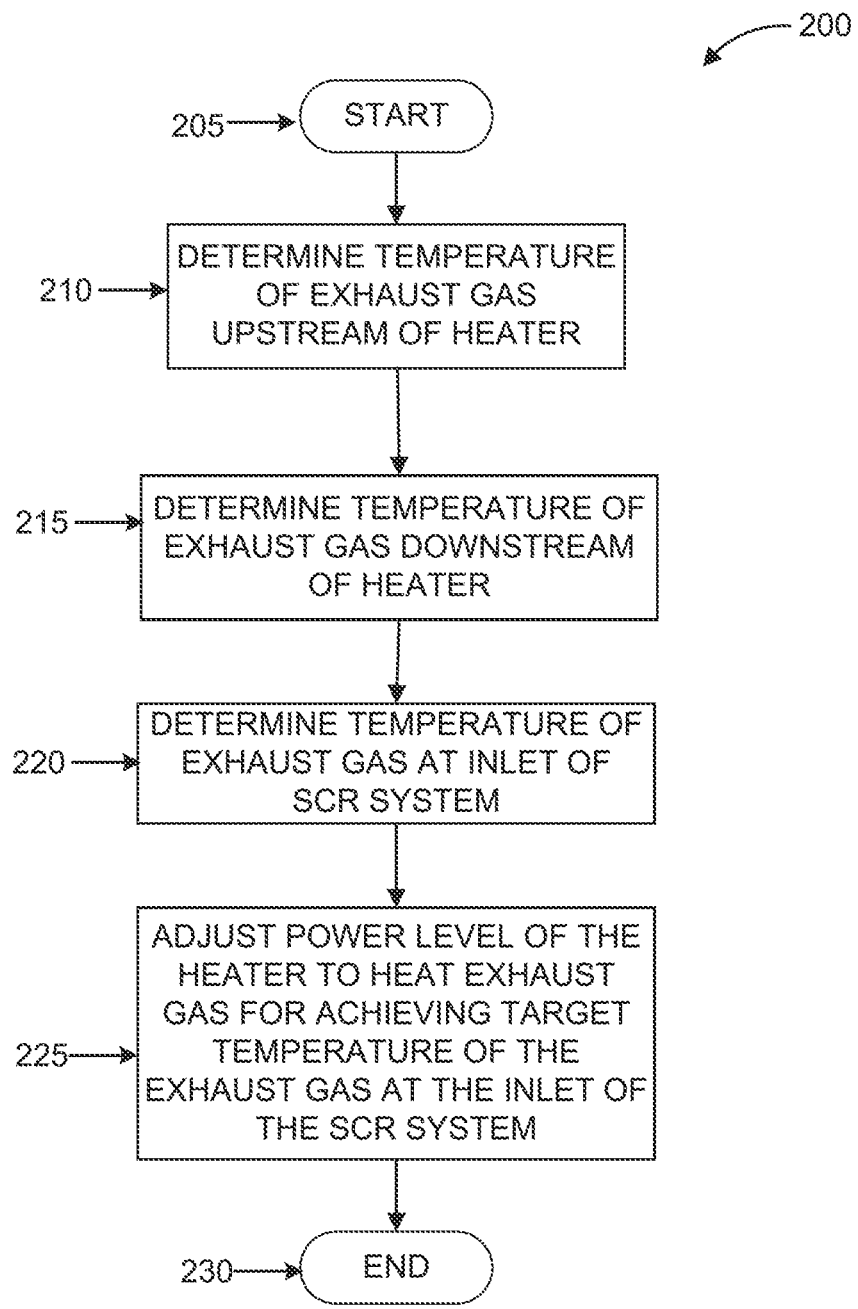
FIG. 2 is an example flowchart outlining operations for achieving a target temperature of exhaust gas at an inlet of an SCR system using a feedback controller of the aftertreatment system of FIG. 1, in accordance with some embodiments of the present disclosure.

Turning to FIG. 2, an example flowchart outlining operations of a process 200 is shown, in accordance with some embodiments of the present disclosure. The process 200 may be used to achieve a desired or targeted temperature at the inlet of the SCR system 130. The process 200 may be implemented by the controller 170. In some embodiments, the controller 170 may be a feedback controller configured to achieve the target temperature at the inlet of the SCR system 130 by selectively activating and deactivating the heater 165. In some embodiments, the controller 170 may also adjust the power of the heater 165 upon activation to achieve the target temperature at the inlet of the SCR system 130. In some embodiments, the process 200 may be run continuously, while in other embodiments, the process 200 may be run periodically (e.g., every few seconds, minutes, etc.) or upon satisfaction of certain conditions (e.g., exhaust gas temperature being greater than or lower than a predetermined temperature).

Thus, to achieve the target temperature at the inlet of the SCR system 130, upon starting at the operation 205, the controller 170 determines the temperature of the exhaust gas entering the aftertreatment system 100 at operation 210. For example, the controller 170 may receive temperature data from the sensor 175B measuring the temperature of the exhaust gas exiting the engine 105 and entering the aftertreatment system 100 via the inlet conduit 110. At operation 215, the controller 170 determines the temperature of the exhaust gas downstream of the heater 165. In some embodiments, the heater 165 may be already activated when the controller measures the temperature of the exhaust gas downstream of the heater. In such cases, as the exhaust gas passes through the heater 165, the exhaust gas may be heated such that the temperature of the exhaust at the outlet of the heater may be greater than the temperature of the exhaust gas in the inlet conduit. In some embodiments, the heater 165 may be deactivated when the controller 170 measures the temperature of the exhaust gas downstream of the heater. In such cases, the temperature of the exhaust gas at the outlet of the heater 165 may be similar to the temperature of the exhaust gas in the inlet conduit 110. In some embodiments, the controller 170 may determine the temperature of the exhaust gas downstream of the heater 165 using temperature sensor data collected by the sensor 175C.

At operation 220, the controller 170 determines the temperature of the exhaust gas at the inlet of the SCR system 130. For example, the controller 170 may receive temperature data from the sensor 175D to determine the temperature of the exhaust gas at the inlet of the SCR system 130. In some embodiments, and depending upon the positioning of the sensor 175D, in some embodiments, the temperature data gathered by that sensor may correspond to the temperature of the exhaust gas along an axial length (e.g., 0-9 inches from the inlet of the SCR system) of the SCR system 130. Thus, the process 200 may be used to control the temperature of the exhaust gas at any location of the SCR system 130, including for example, at the inlet of the SCR system or along any defined axial length (e.g., the front 0-9 inches) of the SCR system. Thus, the positioning of the sensor 175D may be varied to obtain accurate temperature readings from the location of the SCR system 130 where the targeted temperature is desired. In some embodiments, the controller 170 may be configured to adjust the temperature of the exhaust gas between the 5-50% of the axial linear length (also referred to herein as axial length) of the SCR system 130 from the inlet of the SCR system to adjust for catalyst performance changes over time. In some embodiments, the "axial" length of the SCR system 130 may be in the direction that is generally parallel to the direction of flow of the exhaust gas from the engine 105 to the outlet conduit 160.

The temperature data from the sensor 175D may serve as a feedback loop to the controller 170. In some embodiments, the controller 170 may compare the measured or actual temperature at the inlet of the SCR system 130 with the target temperature of the exhaust gas at the inlet of the SCR system to determine an error value. Based on the error value, the temperature of the exhaust gas downstream of the heater 165 (e.g., as measured at the operation 215), and the temperature of the exhaust gas entering the heater 165 (e.g., as measured at the operation 210), the controller 170 adjusts the operation of the heater at operation 225 to heat the exhaust gas such that a target temperature of the exhaust gas at the inlet of the SCR system is achieved. The desired or target temperature at the inlet of the SCR system 130 means a desired or target temperature of the exhaust gas within a given axial length (e.g., 5-50%) from the inlet of the SCR system.

In some embodiments, the controller 170 may modulate between 0% and 100% the duty cycle of the energy being consumed by the heater 165 to target a temperature as measured by the sensor 175D. In other words, depending upon the temperature of the exhaust gas upstream and downstream of the heater 165 and the temperature at the inlet of the SCR system, the controller 170 activates the heater 165 (e.g., if previously inactivated), deactivates the heater (e.g., if previously activated), or adjusts the power level of the heater. In some embodiments, the duty cycle may be associated with a particular heater power. For example, in some embodiments, a 0% duty cycle may mean deactivating the heater 165 or operating the heater at its lowest power setting, a 100% duty cycle may mean operating the heater at full or 100% power, a 50% duty cycle may mean operating the heater at half or 50% power. In some embodiments, the controller 170 may maintain a look-up table to associate the duty cycle with a particular power setting of the heater 165.

The controller 170 may adjust the duty cycle based on the temperature measurements obtained at the operations 210-220. For example, in some embodiments, the controller 170 may be configured to maintain the temperature of the exhaust gas at the inlet of the SCR system 130 between 240° C. and 290° C. If the sensor 175D indicates that the temperature of the exhaust gas at the inlet of the SCR system 130 is below 240° C., the controller 170 may increase the power of the heater 165 (e.g., by increasing the duty cycle) such that the temperature of the exhaust gas downstream of the heater (e.g., as measured by the sensor 175C) increases to 240° C. or greater than 240° C. (e.g., greater by a predetermined threshold to account for any reduction in temperature of the exhaust gas during travel from the heater to the inlet of the SCR system 130) within a predetermined time. Similarly, if the sensor 175D indicates that the temperature of the exhaust gas at the inlet of the SCR system 130 is greater than 290° C., the controller 170 may reduce the power of the heater 165 (e.g., by reducing the duty cycle) such that the temperature of the exhaust gas downstream of the heater (e.g., as measured by the sensor 175C) is at 290° C. or greater than 290° C. (e.g., greater by a predetermined threshold to account for any reduction in temperature of the exhaust gas during travel from the heater to the inlet of the SCR system 130) within a predetermined time.

Thus, based on the feedback of the temperature of the exhaust gas at the inlet of the SCR system 130 and based on the heating rate of the heater 165, the controller 170 may adjust the power level of the heater 165 to maintain a target temperature of the exhaust gas at the inlet of the SCR system 130. In some embodiments, the controller 165 may use other thermal management mechanisms, either in addition to the heater 165 or instead of the heater, to achieve the target temperature of the exhaust gas at the inlet of the SCR. For example, in some embodiments, the controller 170 may dose extra fuel into the engine 105 or insert hydrocarbons into/upstream the DOC 120 via the hydrocarbon insertion assembly 125 to maintain the temperature of the exhaust gas at the inlet of the SCR system 130 at a target temperature. In some embodiments, the controller 170 may target an inlet temperature of the SCR system 130 or at another location of the SCR system that is above a light off temperature (e.g., 200-250° C.) of the DOC 120 in a direct close loop manner. The amount of hydrocarbons to dose into/upstream the DOC 120 may be adjusted to raise the target downstream temperature (e.g., at the inlet of the SCR system 130) to a threshold or target temperature. In some embodiments, the threshold temperature may be 200-280° C. In other embodiments, the threshold temperature may be a higher value (e.g., to drive sulfur from the SCR system 130). Thus, in some embodiments, the controller 170 may measure the temperature at a location (e.g., inlet) of the SCR system 130, measure a temperature at the outlet of the DOC 120, and adjust the insertion of hydrocarbons into the DOC based on the temperature at the location of the SCR system and the temperature at the outlet of the DOC. In other embodiments, yet other heating mechanisms may be used to adjust the temperature of the exhaust gas.

By maintaining the temperature of the exhaust gas at the target temperature at the inlet of the SCR system 130, the controller 170 prevents excessive swings in ammonia storage capacity while increasing the $NO_x$ conversion efficiency, thereby providing a high catalytic conversion with a higher level of ammonia being stored in the active sites of the SCR catalyst 155.

The controller 170, when implementing the process 200, is a feedback controller in which the controller receives feedback of the actual measured temperature at the inlet of the SCR system 130 and adjusts the operation of the heater 165 based on the feedback of the measured temperature at the inlet of the SCR system. In some embodiments, a feedback controller may become unstable, particularly due to the thermal mass of elements (e.g., the DOC 120, the DPF, etc.) between the outlet of the heater 165 and the inlet of the SCR system 130. Specifically, and as shown in FIG. 1, in some embodiments, at least the DOC 120 and the decomposition chamber 135 may be positioned between the outlet of the heater 165 and the inlet of the SCR system 130. Each of the DOC 120 and the decomposition chamber 135 may have some thermal mass that may cause the exhaust gas to gain temperature or lose temperature as the exhaust gas travels from the outlet of the heater 165 to the inlet of the SCR system 130. Thus, by the time the exhaust gas reaches the inlet of the SCR system 130 from the outlet of the heater 165, the temperature of the exhaust gas may have overshot or undershot the target temperature of the exhaust gas at the inlet of the SCR system 130. For example, in some embodiments, if the feedback controller detects an overshoot of the target temperature of the exhaust gas at the inlet of the SCR system 130 (e.g., based on the measured temperature at the inlet of the SCR system), the feedback controller may reduce the power of the heater to reduce the temperature of the exhaust gas, which may then cause an undershoot at the inlet of the SCR system 130 in the next cycle. Thus, in some embodiments, the feedback controller may not control the heater 165 in a very stable manner.

A feedforward controller may instead control the operation of the heater 165 in a more stable manner compared to a feedback controller. Specifically, a feedforward controller may generate a set of forecasts at every time step with each forecast of the set being for a discreet power level of the heater 165. The set of forecasts may be based on a predicted temperature of the exhaust gas at the inlet of the SCR system 130 in the future. For example, a forecast may indicate that at 0 kilowatt power level of the heater 165 (e.g., when the heater is OFF), the temperature of the exhaust gas at the inlet of the SCR system 130 would be 200° C. in the next 50 seconds, at 5 kilowatt power level of the heater, the temperature of the exhaust gas at the inlet of the SCR system would be 250° C. in the next 50 seconds, and so on. If the target temperature at the inlet of the SCR system 130 is 250° C., the feedforward controller may then operate the heater 165 at 5 kilowatt of power level to ensure that the temperature of the exhaust gas at the inlet of the SCR system 130 is 250° C. in the next 50 seconds. Thus, based on the forecasts, the feedforward controller may adjust the operation of the heater 165 to control the temperature of the exhaust gas at the inlet of the SCR system 130 more accurately.

In some embodiments, the controller 170 may be operated in a feedforward mode using a fixed target temperature of the exhaust gas at the inlet of the SCR system 130 or in a feedback mode through a reference shaping feedback loop. Using the reference shaping feedback loop, the target temperature may be slowly shifted using the feedforward controller to reject any steady-state error or error due to system variation. Thus, in some embodiments, the controller 170 may be implemented as a combination of a feedback controller and a feedforward controller.

Figure 3:
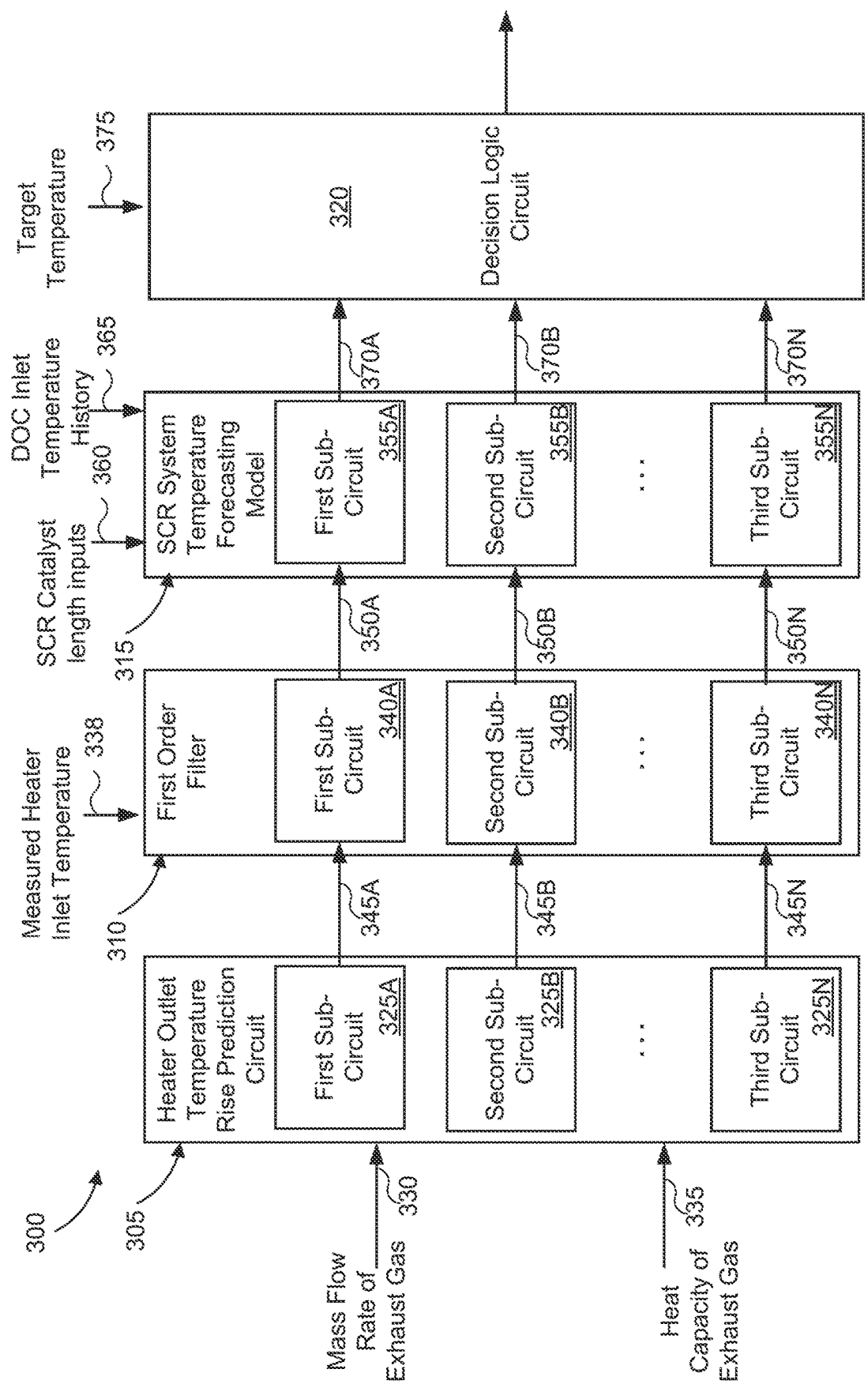
FIG. 3 is an example block diagram of a feedforward controller of the aftertreatment system of FIG. 1, in accordance with some embodiments of the present disclosure.

FIG. 3 shows an example block diagram for a feedforward controller 300, in accordance with some embodiments of the present disclosure. The feedforward controller 300 may include a heater outlet temperature rise prediction circuit 305 to predict the rise in temperature of the exhaust gas as the exhaust gas passes through the heater 165. In other words, the heater outlet temperature rise prediction circuit 305 may be configured to predict the temperature of the exhaust gas at the outlet of the heater 165 at various power levels of the heater. The feedforward controller 300 may also include a first order filter 310 to approximate the dynamics of the heater 165, an SCR system temperature forecasting model 315 to predict the temperature of the exhaust gas at the inlet of the SCR system 130 for the various power levels, and a decision logic circuit 320 to select one of the power levels based on a the predictions of the heater outlet temperature rise prediction circuit 305, the first order filter, the SCR system temperature forecasting model, and the target temperature at the inlet of the SCR system.

The various predictions of the feedforward controller 300 may be performed for a forecast window in a series of time steps. A time step may be the frequency at which the feedforward controller 300 runs the predictions. Thus, each cycle of predictions is one time step. For example, in some embodiments, the feedforward controller 300 may be configured to run the predictions every (e.g., repeat the computations) 200 milliseconds. Thus, each time step may be 200 milliseconds. In other embodiments, the feedforward controller 300 may be configured to run the predictions every second, every 5 seconds, or at other desired time intervals. Each of these time intervals (e.g., every second, 5 seconds, etc.) may constitute one time step. The forecast window may define the time period in the future for which the predictions are made. For example, in some embodiments, the forecast window may be for 50 seconds into the future (e.g., what the temperature of the exhaust gas at the inlet of the SCR system 130 will be in the next 50 seconds). In other embodiments, the forecast window may be greater than or less than 50 seconds. Thus, in some embodiments, the feedforward controller 300 may be configured to run every T1 time units (e.g., time step) to predict the temperature of the exhaust gas at the inlet of the SCR system 130 at the end of T2 time units (e.g., forecast window). For example, the feedforward controller 300 may run every 200 milliseconds to predict the temperature of the exhaust gas at the inlet of the SCR system in the next 50 seconds.

In some embodiments, the feedforward controller 300 may be configured with fixed forecast windows. With a fixed forecast window, each forecast window (e.g., 50 seconds) is the same. In some embodiments, the forecast window may be dynamic. With a dynamic forecast window, the time period in the future for which the predictions are made may vary. For example, in some embodiments, in one time step, the feedforward controller 300 may make a prediction for a first forecast window (e.g., 50 seconds) and in the next time step, the feedforward controller may make a prediction for a second forecast window (e.g., 100 seconds). In some embodiments, the dynamic forecast window may be based on a calculated delay time plus a calibrated length of time. In some embodiments, the calibrated length of time may be 0.2 seconds. In other embodiments, the calibrated length of time may vary. Thus, depending upon the calculated time delay, the forecast window may vary. In some embodiments, a cap may be imposed on the forecast window. For example, in some embodiments, the forecast window may be capped at 425 seconds. Thus, when the calculated time delay plus the calibrated length of time becomes greater than 425 seconds, the feedforward controller 300 may use the capped length (e.g., 425 seconds) as the forecast window. In other embodiments, the feedforward controller 300 may be configured with other cap values for the forecast window and/or use values other than the capped value when the forecast window becomes greater than the capped value. The computation of the time delay is discussed below.

Referring specifically now to the heater outlet temperature rise prediction circuit 305, the heater outlet temperature rise prediction circuit may include one or more sub-circuits, with each sub-circuit configured to predict temperature rise of the exhaust gas at the outlet of the heater for a given power level. For example, and as shown in FIG. 3, the heater outlet temperature rise prediction circuit 305 may include a first sub-circuit 325A, a second sub-circuit 325B, and a third sub-circuit 325N. In some embodiments, the first sub-circuit 325A may correspond to a 0 kilowatt power level of the heater 165 (e.g., the heater OFF), the second sub-circuit 325B may correspond to a 50% power level (e.g., 5 kilowatt power level for a 10 kilowatt heater) of the heater, and the third sub-circuit 325N may correspond to a 100% or full power level (e.g., 10 kilowatt power level for a 10 kilowatt heater) of the heater. In other embodiments, one or more of the first sub-circuit 325B, the second sub-circuit 325B, and the third sub-circuit 325N may correspond to other heater power levels. Further, although three sub-circuits (e.g., the first sub-circuit 325B, the second sub-circuit 325B, and the third sub-circuit 325N) are shown in the heater outlet temperature rise prediction circuit 305, in other embodiments, the heater outlet temperature rise prediction circuit may include fewer than or greater than three sub-circuits depending upon the number of power levels of the heater 165 for which a prediction is desired. For purposes of explanation only, the description below is with respect to three power levels of the heater 165—a first power level of 0% or Heater OFF (e.g., heater operating at 0% power level), a second power level of 50% (e.g., heater operating at 50% power level), and a third power level of 100% (e.g., heater operating at full capacity or 100% power level).

The various power levels may be input into the respective sub-circuits. For example, in some embodiments, the first sub-circuit 325A may be programmed with the 0% power level (e.g., Heater OFF), the second sub-circuit 325B may be programmed with the 50% power level (e.g., 5 Kilowatt), and the third sub-circuit 325N may be programmed with the 100% power level (e.g., 10 kilowatt). Further, each of the first sub-circuit 325B, the second sub-circuit 325B, and the third sub-circuit 325C may be programmed to compute the temperature rise of the exhaust gas at the outlet of the heater 165 using the following formula:

$$\Delta T = \frac{\dot{q}}{\dot{m} * C_p}$$

In the formula above, $\Delta T$ is the temperature rise of the exhaust gas at the outlet of the heater 165, or in other words, the difference between the temperature of the exhaust gas at the inlet of the heater and the outlet of the heater; $\dot{q}$ is the power consumed by the heater (e.g., the power level of the heater) in watts, $\dot{m}$ is the mass flow rate of the exhaust gas in kg/s; and $C_p$ is the heat capacity of the exhaust gas in J/(kg*K). Thus, in addition to the heater power level (e.g., the value of the $\dot{q}$ variable in the formula above), each of the first sub-circuit 325B, the second sub-circuit 325B, and the third sub-circuit 325N may also receive a mass flow rate of exhaust gas input 330 (e.g., the value of the $\dot{m}$ variable in the formula above) and a heat capacity of exhaust gas input 335 (e.g., the value of the $C_p$ variable in the formula above). In some embodiments, the feedforward controller 300 may have sensors that sense the mass flow rate of the exhaust gas and/or the heat capacity of the exhaust gas and input those measurements as the mass flow rate of exhaust gas input 330 and the heat capacity of exhaust gas input 335, respectively. In other embodiments, the feedforward controller 300 may determine the values of the mass flow rate of the exhaust gas and/or the heat capacity of the exhaust gas in other ways. Further, in some embodiments, the feedforward controller 300 may predict the temperature rise of the exhaust gas at the outlet of the heater 165 using other suitable formulas or in other ways.

Thus, each of the first sub-circuit 325A, the second sub-circuit 325B, and the third sub-circuit 325N may compute the temperature rise of the exhaust gas at the outlet of the heater 165 using the formula above for the heater power level that the particular sub-circuit is configured for. The temperature rise, $\Delta T$, for the heater power level 0 kilowatt (e.g., when the heater is OFF) is zero. For other heater power levels, the temperature rise, $\Delta T$, is a non-zero value. The temperature rise, $\Delta T$, may be added to a measured heater inlet gas temperature 338 that is input into the first order filter 310. Similar to the heater outlet temperature rise prediction circuit 305, the first order filter 310 may have a plurality of sub-circuits, with each sub-circuit being configured for a particular power level. For example, in some embodiments, the first order filter 310 may include a first sub-circuit 340A, a second sub-circuit 340B, and a third sub-circuit 340N. In general, the number of sub-circuits in the first order filter 310 may be same as the number of sub-circuits in the heater outlet temperature rise prediction circuit 305. Further, each sub-circuit in the first order filter 310 may correspond to one power level in the heater outlet temperature rise prediction circuit 305. For example, the first sub-circuit 340A may correspond to the same power level (e.g., 0%) as the first sub-circuit 325A, the second sub-circuit 340B may correspond to the same power level (e.g., 50%) as the second sub-circuit 325B, and the third sub-circuit 340N may correspond to the same power level (e.g., 100%) as the third sub-circuit 325N.

Thus, the first sub-circuit 340A of the first order filter 310 may receive a first temperature rise output 345A from the first sub-circuit 325A of the heater outlet temperature rise prediction circuit 305, the second sub-circuit 340B of the first order filter may receive a second temperature rise output from the second sub-circuit 325B, and the third sub-circuit 340N may receive a third temperature rise output 345N from the third sub-circuit 325N of the heater outlet temperature rise prediction circuit. Each of the first sub-circuit 340A, the second sub-circuit 340B, and the third sub-circuit 340N may perform computations to approximate the dynamics of the heater 165. In other words, the heater 165 may take time to heat up the exhaust gas due to the mass of the heater (e.g., the temperature of the exhaust gas may not ramp up to a steady state immediately when the heater is activated). Each of the first sub-circuit 340A, the second sub-circuit 340B, and the third sub-circuit 340N may be configured to predict the temperature of the exhaust gas at the outlet of the heater 165 in a given time step based on the temperature rise, $\Delta T$, the measured heater inlet gas temperature 338, and the mass of the heater.

In some embodiments, each of the first sub-circuit 340A, the second sub-circuit 340B, and the third sub-circuit 340N may be configured to approximate the dynamics of the heater 165 using the following formula:

$$Y(k)=dt/(tau+dt)*(X(k)+tau/dt*Y(k-1))$$

In the formula above, Y(k) is the predicted temperature of the exhaust gas at the outlet of the heater 165 at the $k^{th}$ time division of the forecast; dt is the size of one of the divisions of time into which each forecast is divided; tau is the user definable filter time constant whose value is chosen such that the first order filter's behavior accurately represents the heater's; X(k) is the heater outlet temperature rise $\Delta T$ plus the heater inlet gas temperature. In other embodiments, one or more of the first sub-circuit 340A, the second sub-circuit 340B, and the third sub-circuit 340N may be configured to approximate the dynamics of the heater 165 using other formulas, other types of numeric filters, and/or in other ways.

Thus, each of the first sub-circuit 340A, the second sub-circuit 340B, and the third sub-circuit 340N may compute heater dynamics and transmit a first gas temperature output 350A, a second gas temperature output 350B, and a third gas temperature output 350N, respectively, in each time step to the SCR system temperature forecasting model 315. Each of the first gas temperature output 350A, the second gas temperature output 350B, and the third gas temperature output 350N may correspond to a predicted temperature of the exhaust gas at the outlet of the heater 165 for the forecasted window. For example, the first gas temperature output 350A may predict that the temperature of the exhaust gas at the outlet of the heater 165 throughout a forecast window (e.g., 50 seconds) will be T3° C., the second gas temperature output 350B may predict that the temperature of the exhaust gas at the outlet of the heater 165 throughout the forecast window (e.g., 50 seconds) will be T4° C., and so on.

Referring still to FIG. 3, the SCR system temperature forecasting model 315 may include a plurality of sub-circuits. For example, the SCR system temperature forecasting model 315 may include a first sub-circuit 355A, a second sub-circuit 355B, and a third sub-circuit 355N. Each of the first sub-circuit 355A, the second sub-circuit 355B, and the third sub-circuit 355N may correspond to one of the power levels of the sub-circuits of the heater outlet temperature rise prediction circuit 305 and the first order filter 310. Thus, the first sub-circuit 355A may correspond to the heater level (e.g., 0%) of the first sub-circuit 340A of the first order filter 310 and the first sub-circuit 325A of the heater outlet temperature rise prediction circuit 305, the second sub-circuit 355B may correspond to the power level (e.g., 50%) of the second sub-circuit 340B of the first order filter and the second sub-circuit 325B of the heater outlet temperature rise prediction circuit, and the third sub-circuit 355N may correspond to the power level (e.g., 100%) of the third sub-circuit 340N of the first order filter and the third sub-circuit 325N of the heater outlet temperature rise prediction circuit. Therefore, the first sub-circuit 355A may receive the first gas temperature output 350A from the first sub-circuit 340A of the first order filter 310, the second sub-circuit 355B may receive the second gas temperature output 350B from the second sub-circuit 340B of the first order filter, and the third sub-circuit 355N may receive the third gas temperature output 350N from the third sub-circuit 340N of the first order filter.

Each of the first sub-circuit 355A, the second sub-circuit 355B, and the third sub-circuit 355N may be configured as a first order delay system which may step forward in time (e.g., to the forecast window) to generate a forecast temperature of the exhaust gas at the inlet of the SCR system 130 based on the predicted temperature of the exhaust gas at the outlet of the heater 165 produced by the first order filter 310. In some embodiments, each of the first sub-circuit 355A, the second sub-circuit 355B, and the third sub-circuit 355N may predict the temperature of the exhaust gas at the inlet of the SCR system 130 at different axial locations in the SCR catalyst 355. In some embodiments, the first sub-circuit 355A, the second sub-circuit 355B, and the third sub-circuit 355N may receive SCR catalyst length inputs 360 and DOC temperature inlet history inputs 365. The SCR catalyst length inputs 360 may include an axial location of the SCR catalyst 155 at which the target temperature of the exhaust gas is to be achieved and the total length of the SCR catalyst 155. In some embodiments, the axial location may include a 5%-50% axial location from the inlet of the SCR catalyst 155. In other embodiments, the axial location may be between 0 and 9 inches from the inlet of the SCR catalyst 155. In other embodiments, the axial location may include any point along the axial length of the SCR catalyst 155 from the front face of the SCR brick (e.g., the SCR catalyst).

In some embodiments, each of the first sub-circuit 355A, the second sub-circuit 355B, and the third sub-circuit 355N may predict the temperature of the exhaust gas at the inlet of the SCR system 130 using the following formulas:

$$\frac{\partial T_s}{\partial t}(x, t) = k_1(T_g(x, t) - T_s(x, t))$$

$$\dot{m}_g \frac{\partial T_g}{\partial t}(x, t) = k_2(T_s(x, t) - T_g(x, t))$$

$$\forall\, 0 \leq x \leq L$$

$$r\frac{\partial T_s}{\partial t} = -T_s + T_g(t - D)$$

with $$\begin{cases} \tau(x, t) = \frac{1}{k_1} + v\delta(x, t) \\ D(x, t) = (1 - v)\delta(x, t) \end{cases}$$

where $v$ is a constant in [0, 1]

$$\int_{t-\delta(x,t)}^{t} \frac{k_1}{k_2} \dot{m}_g(s)ds = x$$

In the formula above, x is the axial location of the SCR catalyst 155, L is the total length of the SCR catalyst, $T_g$ is the temperature of the exhaust gas at the inlet of the SCR system 130, $T_s$ is the bed temperature of the SCR catalyst, $\dot{m}_g$ is the history vector of exhaust mass flow, τ(x, t) is the model time constant, D(x, t) is the time delay, k1, k2 are constants, and δ(x, t) is a function of exhaust flow defined by the integral:

$$\int_{t-\delta(x,t)}^{t} \frac{k_1}{k_2} \dot{m}_g(s)ds = x$$

In some embodiments, τ(x, t) and D(x, t) may be key inputs into each of the first sub-circuit 355A, the second sub-circuit 355B, and the third sub-circuit 355N, and may be calculated on the fly as a function of (a) previous mass flow; (b) the SCR catalyst 155 substrate dimensions and physical properties; and (c) target location (e.g., targeted axial location) within the SCR catalyst. To calculate the τ(x, t) and D(x, t) using the equations above, the SCR system temperature forecasting model 315 may implement one of two approaches—(1) a lumped approach that approximates all of the elements (e.g., the heater 165, the DOC 120, the DPF, the decomposition chamber 135, and the SCR system 130) in the aftertreatment system 100 as one long single substrate to approximate the overall τ(x, t) and D(x, t) for the targeted axial location of the SCR system; (2) a combined approach that calculates the individual τ(x, t) and D(x, t) for each component (e.g., the heater 165, the DOC 120, the DPF, the decomposition chamber 135, and the SCR system 130) of the aftertreatment system 100 individually and combines the individual calculations to approximate the overall τ(x, t) and D(x, t) for the targeted axial location of the SCR system 130.

In some embodiments, the combined approach may be preferable to allow the τ(x, t) and D(x, t) to be calculated for any location of the aftertreatment system 100, allowing the feedforward controller 300 to change its heating objective on the fly.

Further, the calculated value of D(x, t) may be used to compute the forecast window, as discussed above. For example, the calculated value of D(x, t) may be added to the calibrated length of time to determine the next forecast window. Additional details of the first order delay system implemented by the SCR system temperature forecasting model 315 are defined in D. Bresch-Pietri, T. Leroy and N. Petit, "Control-oriented time-varying input-delayed temperature model for SI engine exhaust catalyst," 2013 *American Control Conference*, Washington, D.C., 2013, pp. 2189-2195, the entirety of which is incorporated by reference herein. Notwithstanding the example and equations of the first order delay system implemented by the SCR system temperature forecasting model 315 described herein, in other embodiments, other temperature models may be used to predict the temperature of the exhaust gas at the inlet of the SCR system 130.

The output from each of the first sub-circuit 355A, the second sub-circuit 355B, and the third sub-circuit 355N may be a temperature profile over the forecast window at the respective power level of the heater 165. For example, the first sub-circuit 355A may generate a first temperature profile 370A over the forecast window for the 0% power level of the heater 165, the second sub-circuit 355B may generate a second temperature profile 370B over the forecast window for the 50% power level, and the third sub-circuit 355N may generate a third temperature profile 370N over the forecast window for the 100% power level of the heater. Each of the first temperature profile 370A, the second temperature profile 370B, and the third temperature profile 370N may include predicted temperatures of the exhaust gas at the inlet of the SCR system 130 at various points in time over the forecast window. An example temperature profile is discussed below with respect to FIG. 4.

Each of the first temperature profile 370A, the second temperature profile 370B, and the third temperature profile 370N may be input into the decision logic circuit 320. The decision logic circuit 320 may be used to select one of the power levels of the heater 165 based on the first temperature profile 370A, the second temperature profile 370B, and the third temperature profile 370N and a target temperature input 375. The target temperature input 375 corresponds to the target temperature of the exhaust gas at the inlet of the SCR system 130. In some embodiments, the target temperature input 375 may be a one dimensional vector of targeted temperature of the exhaust gas at the inlet of the SCR system 130 and may vary over the length of the forecast. In other embodiments, the target temperature input 375 may remain constant over all time steps. In other embodiments, the target temperature input 375 may be dynamic and may change from one time step of the feedforward controller 300 to another.

In some embodiments, the decision logic circuit 320 may compute a sum-of-squares error between the temperatures indicated in the first temperature profile 370A, the second temperature profile 370B, and the third temperature profile 370N and the target temperature input 375. The decision logic circuit 320 may then select the power level of the heater 165 corresponding to the temperature profile having a minimum sum-of-squares error value. If multiple temperature profiles have the same sum-of-square error value, in some embodiments, the decision logic circuit 320 may determine a difference between the first gas temperature output 350A, the second gas temperature output 350B, or the third gas temperature output 350N, and the target temperature input 375, and use the power level corresponding to the gas temperature output that is closest to the target temperature input.

Thus, the decision logic circuit 320 may compute the sum-of-squares error value for each of the first temperature profile 370A, the second temperature profile 370B, and the third temperature profile 370N as follows:

$$\varepsilon_{ON} = \left\| T_{Pred,Gas}^{ON} - T_{Trgt} \right\|^2 = \sum_{i=1}^{\Delta} \left( T_{Pred,i}^{ON} - T_{Trgt}, i \right)^2$$

$$\varepsilon_{OFF} = \left\| T_{Pred,Gas}^{OFF} - T_{Trgt} \right\|^2 = \sum_{i=1}^{\Delta} \left( T_{Pred,i}^{OFF} - T_{Trgt}, i \right)^2$$

In the formulas above, $\varepsilon_{ON}$ is the sum-of-squares error between the temperature profile corresponding to heater ON (e.g., the second temperature profile 370B or the third temperature profile 370N) and the target temperature input 375, $\varepsilon_{OFF}$ is the sum-of-squares error between the temperature profile corresponding to heater OFF (e.g., the first temperature profile 370A) and the target temperature input, $T_{Pred,Gas}^{ON}$ is the predicted exhaust gas temperature at the outlet of the heater 165 for heater ON (e.g., the second gas temperature output 350B or the third gas temperature output 350N), $T_{Pred,Gas}^{OFF}$ is the predicted exhaust gas temperature at the outlet of the heater 165 for heater OFF (e.g., the first gas temperature output 350A), $T_{Trgt}$ is a one-dimensional vector of targeted catalyst bed temperature (e.g., the target temperature input 375), and Δ is the number of points in time in the forecast window, $T_{Trgt,i}$ is the $i^{th}$ element of $T_{Trgt}$.

Thus, upon computing the first temperature profile 370A, the second temperature profile 370B, and the third temperature profile 370N, the decision logic circuit 320 may compute a sum-of-squares error using one of the formulae above. Upon computing the sum-of-squares error, the decision logic circuit 320 may determine the minimum sum-of-squares error value amongst all the computed sum-of-square error values as follows:

$$\text{Decision} = \begin{cases} \min_{ON, OFF} \varepsilon_{ON}, \varepsilon_{OFF}, & \text{if } \varepsilon_{ON} \neq \varepsilon_{OFF} \\ \text{else} \\ \min_{ON, OFF} |T^{ON}_{Pred,Gas} - T_{Trgt}|, |T^{OFF}_{Pred,Gas} - T_{Trgt}| \end{cases}$$

Thus, the decision logic circuit 320 determines the minimum of the sum-of-squares error value and designates the power level of the heater 165 corresponding to the minimum sum-of-squares error value. If multiple minimum sum-of-squares error values are found, then the decision logic circuit 320 may compute a difference between the predicted temperature at the outlet of the heater 165 (e.g., the first gas temperature output 350A, the second gas temperature output 350B, and the third gas temperature output 350N) corresponding to the minimum sum-of-square error values and the target temperature input 375, and use the power level of the heater 165 having the minimum difference.

Although a sum-of-squares error functionality has been used in the decision logic circuit 320, in other embodiments, the decision logic circuit may implement other functionalities to select a power level of the heater 165 to achieve a target temperature of the exhaust gas at the inlet of the SCR system 130. Although the heater outlet temperature rise prediction circuit 305, the first order filter 310, and the SCR system temperature forecasting model 315 have been shown as having a plurality of sub-circuits, with each sub-circuit being designated for one power level, in some embodiments, one or more of the heater outlet temperature rise prediction circuit, the first order filter, and the SCR system temperature forecasting model may be configured to include a single circuit configured to perform the operations of the plurality of sub-circuits therein. Further, although not shown, each of the heater outlet temperature rise prediction circuit 305, the first order filter 310, the SCR system temperature forecasting model 315, and the decision logic circuit 320 may include a processor that executes computer readable instructions stored on a memory. In some embodiments, each of the heater outlet temperature rise prediction circuit 305, the first order filter 310, the SCR system temperature forecasting model 315, and the decision logic circuit 320 may have its own instance of a processor and memory. In other embodiments, one or more of the heater outlet temperature rise prediction circuit 305, the first order filter 310, the SCR system temperature forecasting model 315, and the decision logic circuit 320 may share processors and/or memories. Further, in some embodiments, the feedforward controller may use an optimization routine whose cost function is the error between a targeted temperature of the exhaust gas at the inlet of the SCR system 130 and the forecast produced by the SCR system temperature forecasting model 315 and whose variable is the heater power level.

Figure 4:
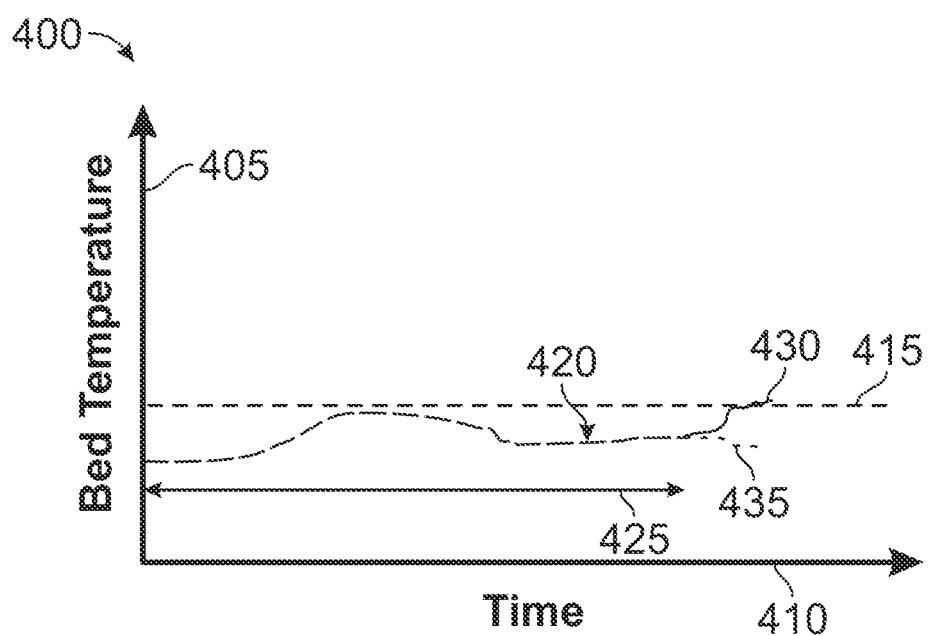
FIG. 4 is an example temperature profile generated by the feedforward controller of FIG. 3, in accordance with some embodiments of the present disclosure.

Turning now to FIG. 4, an example temperature profile 400 is shown, in accordance with some embodiments of the present disclosure. The temperature profile 400 is generated as an output from the SCR system temperature forecasting model 315. The temperature profile 400 plots bed temperature of the SCR catalyst 155 on Y-axis 405 against time on X-axis 410. Specifically, the temperature profile 400 is a combined temperature profile corresponding to the power level of the heater OFF (e.g., 0% power level) and ON (e.g., 50% or 100% power level). The temperature profile 400 shows a desired target temperature 415 (e.g., corresponding to the target temperature input 375) and a forecast plot 420. A first portion 425 of the forecast plot 420 corresponds to both the heater ON and heater OFF cases. When the heater is turned ON after being turned OFF, the heater 165 takes time to heat up and propagate the impact of the heat to the inlet of the SCR system 130. The first portion 425 of the forecast plot 420 reflects that time before the effects of the heater 165 are seen at the SCR system. Therefore, the first portion 425 of the forecast plot 420 is identical for both the heater ON and heater OFF cases. It is to be understood that if the heater 165 was ON at a first power level in a first time step and the operation of the heater is adjusted to being ON at a second power level in a second time step, the first portion 425 of the forecast plot 425 may or may not be identical for the heater ON and heater OFF cases.

Upon the effects of the heater 165 reaching the inlet of the SCR system 130 in the heater ON cases, the forecast plot 420 for the heater OFF and heater ON cases diverge. For example, the forecast plot 420 includes a second portion 430 corresponding to the heater ON case indicating the increase in the exhaust gas, and therefore, in the temperature of the bed temperature of the SCR catalyst 155, and a third portion 435, corresponding to the heater OFF case, which shows that the bed temperature of the SCR catalyst 155 remains about the same. The combination of the first portion 425 and the second portion 430 of the forecast plot 420 may correspond to the second temperature profile 370B (e.g., for 50% heater power level) or the third temperature profile 370N (e.g., for 100% heater power level), while the combination of the first portion and the third portion 435 of the forecast plot may correspond to the first temperature profile 370A (e.g., for 0% heater power level). Although the temperature profile 400 combines two temperature profiles into a single forecast plot (e.g., the forecast plot 420), in other embodiments, separate temperature profiles for each power level of the heater 165 may be generated. Similarly, although the temperature profile 400 shows two temperature profiles (e.g., heater ON and OFF) combined into the forecast plot 420, in other embodiments, the forecast plot may include plots for various degrees of heater ON (e.g., 50% heater power level and 100% heater power level).

Based on the temperature profile 400, the decision logic circuit 320 selects the power level for adjusting the operation of the heater 165. For example, the decision logic circuit 320 may select the power level corresponding to the portions of the forecast plot 420 that have a minimum sum-of-squares error with respect to the target temperature 415. In the temperature profile 400, between the second portion 430 and the third portion 435, the second portion has a lower sum-of-squares error relative to the target temperature 415. Thus, the decision logic circuit 320 may select the power level corresponding to the second portion, adjust the heater 165 operation based on the selected heater power level until new forecasts are generated in the next time step, and the cycle repeats.

Figure 5:
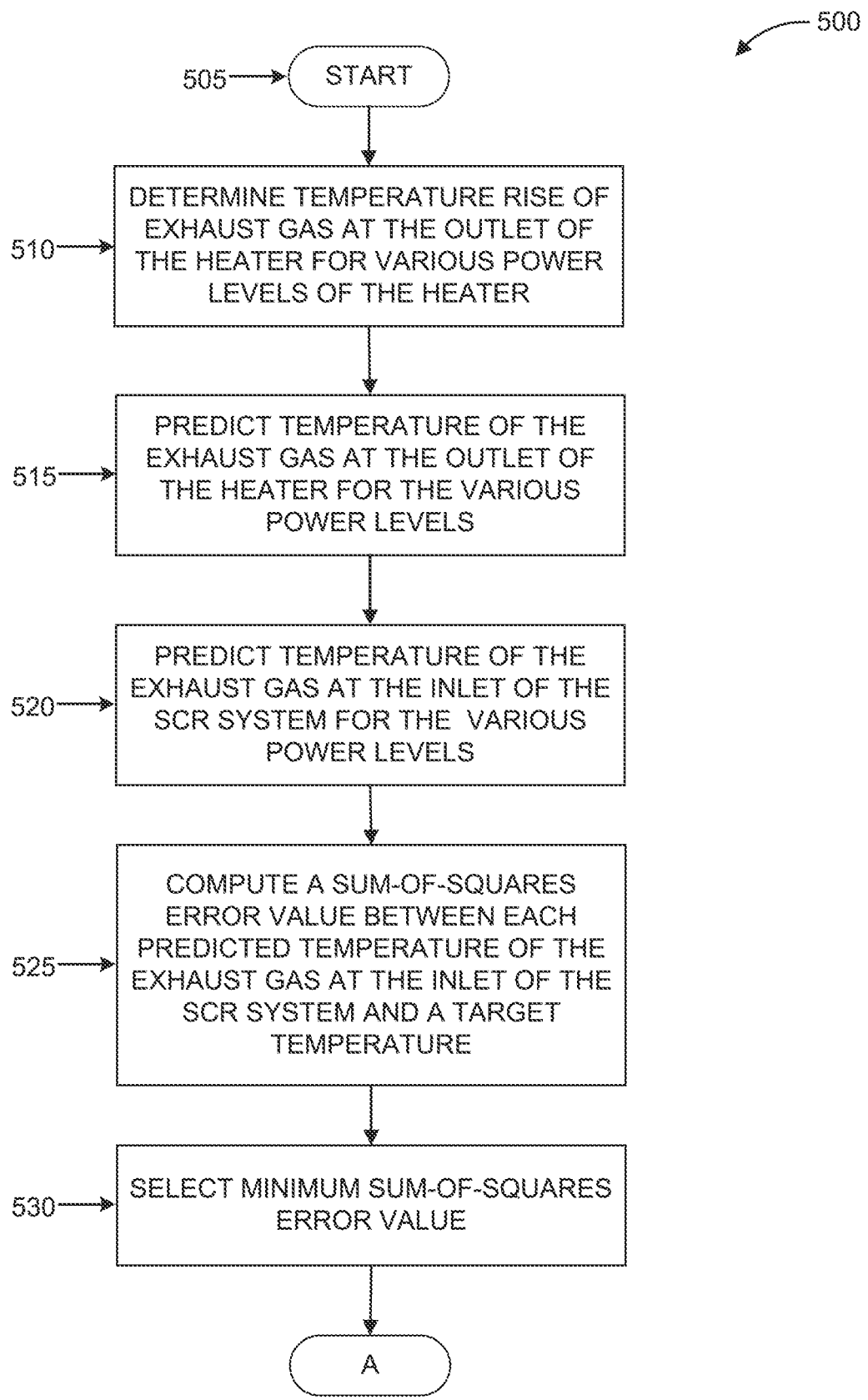
FIG. 5 is an example flow chart outlining operations for achieving the target temperature of the exhaust gas at the inlet of an SCR system using the feedforward controller of FIG. 3, in accordance with some embodiments of the present disclosure.
Figure 5:
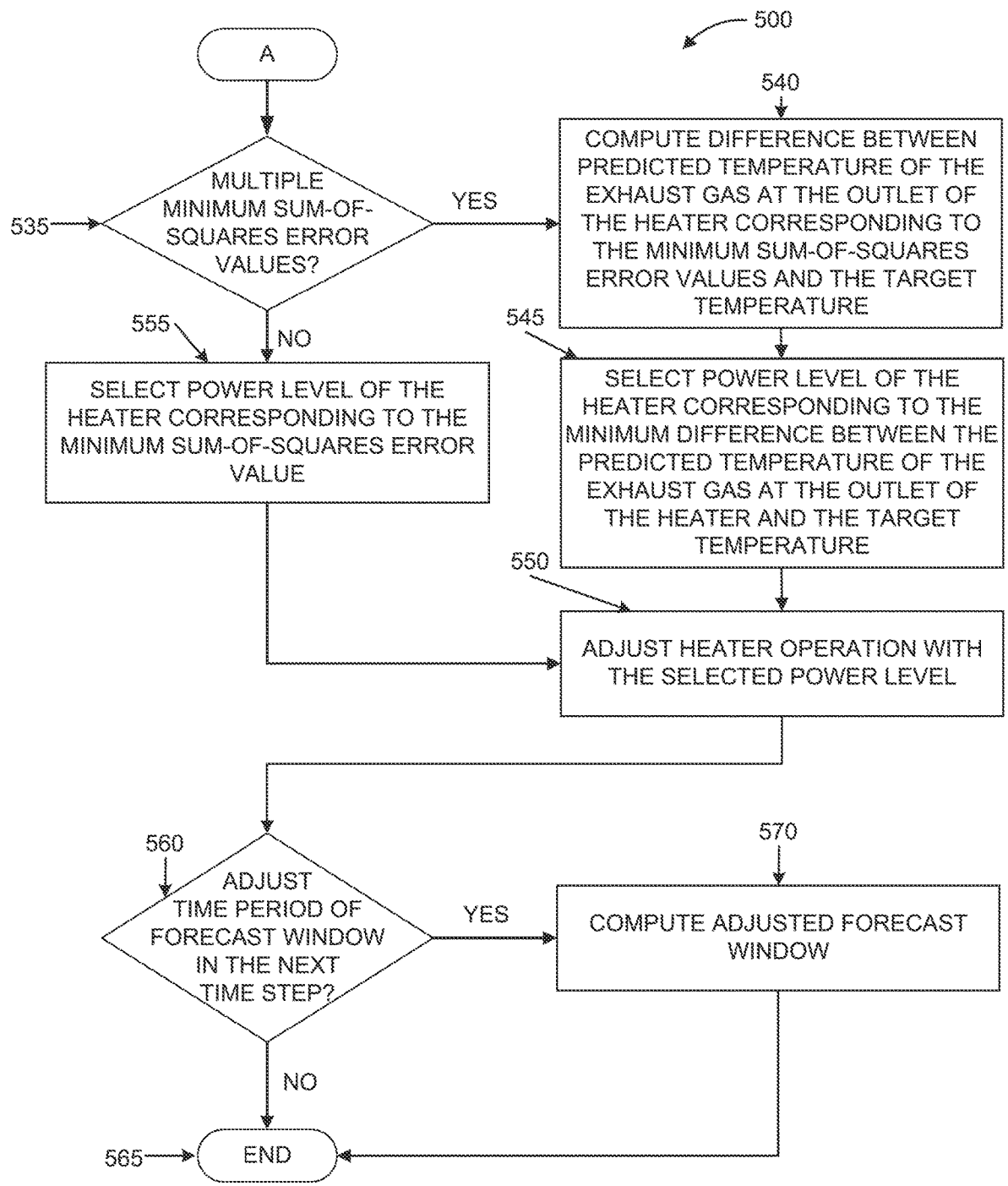

Referring to FIG. 5, an example flowchart outlining a process 500 is shown, in accordance with some embodiments of the present disclosure. The process 500 may be implemented by the feedforward controller 300. The process 500 may be used to predict the temperature of the exhaust gas at the inlet of the SCR system 130 throughout a forecast window. The process 500 may be repeated in each time step. Thus, upon starting at operation 505, the feedforward controller 300 determines the rise in temperature of the exhaust gas at the outlet of the heater 165 for various power levels (e.g., 0%, 50%, 100%) at operation 510. Specifically, the exhaust gas may enter into the aftertreatment system 100 at a particular temperature. As the exhaust gas travels through the heater 165, the heater may heat the exhaust gas. The rise in the temperature of the exhaust gas as the exhaust gas travels through the heater 165 may be dependent upon the power level of the heater. For example, the heater running at full power (e.g., 100%) may heat the exhaust gas more than the heater running at half power (e.g., 50%). Thus, the heater outlet temperature rise prediction circuit 305 determines the rise in temperature of the exhaust gas at the outlet of the heater 165 for the various power levels of the heater at the end of the forecast window, as discussed above. The heater outlet temperature rise prediction circuit 305 outputs the first temperature rise output 345A indicating the temperature rise of the exhaust gas at the outlet of the heater 165 at a first power level (e.g., 0% power level) at the end of the forecast window, the second temperature rise output 345B indicating the temperature rise of the exhaust gas at the outlet of the heater at a second power level (e.g., 50% power level) at the end of the forecast window, and the third temperature rise output 345N indicating the temperature rise of the exhaust gas at the outlet of the heater at a third power level (e.g., 100% power level) at the end of the forecast window.

At operation 515, the feedforward controller 400 predicts the temperature of the exhaust gas at the outlet of the heater 165 based on the rise in temperature of the exhaust gas at the outlet of the heater as determined at the operation 510. Specifically, the first temperature rise output 345A, the second temperature rise output 345B, and the third temperature rise output 345N are input into the first order filter 310. The first order filter 310 approximates the dynamics (e.g., thermal mass) of the heater 165 to predict the temperature of the exhaust gas at the outlet of the heater for the various power levels (e.g., 0%, 50%, 100%) throughout the forecast window, as discussed above. The first order filter 310 outputs the first gas temperature output 350A indicating the temperature of the exhaust gas at the outlet of the heater 165 at the first power level (e.g., 0% power level) throughout the forecast window, the second gas temperature output 350B indicating the temperature of the exhaust gas at the outlet of the heater at the second power level (e.g., 50% power level) throughout the forecast window, and the third gas temperature output 350N indicating the temperature of the exhaust gas at the outlet of the heater at the third power level (e.g., 100% power level) throughout the forecast window.

The temperature of the exhaust gas at the outlet of the heater 165 may then be used to predict the temperature of the exhaust gas at the inlet of the SCR system 130 throughout the forecast window. Thus, at operation 520, the feedforward controller 300 predicts the temperature of the exhaust gas at the inlet of the SCR system 130 for the various power levels. As discussed above, the "inlet of the SCR system" means a bed temperature of the SCR catalyst 155 over a designated axial length of the SCR catalyst. In some embodiments, a temperature model such as first order delay system temperature model may be used to predict the temperatures of the exhaust gas at the inlet of the SCR system 130. Thus, the first gas temperature output 350A, the second gas temperature output 350B, and the third gas temperature output 350N generated at the operation 515 are input into the SCR system temperature forecasting model 315. The SCR system temperature forecasting model 315 considers the delay and mass of the elements (e.g., the DOC 120, the DPF, the decomposition chamber 135, etc.) that are located between the outlet of the heater 165 and the inlet of the SCR system 130. Depending upon the number and thermal mass of the elements between the outlet of the heater 165 and the inlet of the SCR system 130, the temperature of the exhaust gas at the inlet of the SCR system may vary as the exhaust gas travels through those elements. The temperature at the inlet of the SCR system 130 may also vary based on the power level of the heater 165. For example, in some embodiments, the temperature of the exhaust gas at the inlet of the SCR system 130 may be higher for a higher power level than for a lower power level.

Thus, the SCR system temperature forecasting model 315 predicts the temperature of the exhaust temperature at the inlet of the SCR system 130 for the various heater power levels, as discussed above. In some embodiments, the SCR system temperature forecasting model 315 may use a combined approach, as discussed above, to predict the temperature of the exhaust gas at the inlet of the SCR system 130. Since the combined approach determines the delay through each individual element of the aftertreatment system 100, the SCR system temperature forecasting model 315 may also be used to predict the temperature of the exhaust gas at other elements of the aftertreatment system. Similarly, since the SCR system temperature forecasting model 315 receives the SCR catalyst length inputs 360, the SCR system temperature forecasting model may be used to determine the temperature of the exhaust gas at other locations (mid bed temperature) of the SCR catalyst 155.

Upon predicting the temperature of the exhaust gas at the inlet of the SCR system 130, the SCR system temperature forecasting model 315 outputs one or more temperature profiles (e.g., the temperature profile 400, the first temperature profile 370A, the second temperature profile 370B, or the third temperature profile 370N) for the various power levels. For example, in some embodiments, the SCR system temperature forecasting model 315 may output the first temperature profile 370A indicating the temperature of the exhaust gas at the inlet of the SCR system 130 at the first power level (e.g., 0% power level) at various points in times until the end of the forecast window. Similarly, the SCR system temperature forecasting model 315 may output the second temperature profile 370B indicating the temperature of the exhaust gas at the inlet of the SCR system 130 at the second power level (e.g., 50% power level) at various points in times until the end of the forecast window, and the third temperature profile 370N indicating the temperature of the exhaust gas at the inlet of the SCR system 130 at the third power level (e.g., 100% power level) at various points in times until the end of the forecast window. In some embodiments, the SCR system temperature forecasting model 315 may combine the first temperature profile 370A, the second temperature profile 370B, or the third temperature profile 370N, and output the combined temperature profile to the decision logic circuit 320.

At operation 525, the feedforward controller 300, and particularly the decision logic circuit 320 of the feedforward controller, performs computations to enable selection of one of the various power levels (e.g., the first heater power level, the second heater power level, or the third heater power level). Specifically, for each temperature profile, the decision logic circuit 320 may compute a sum-of-squares error value between the predicted temperature of the exhaust gas at the inlet of the SCR system 130 at a particular power level and the target temperature of the exhaust gas at the inlet of the SCR system. Thus, for each power level, a sum-of-squares error value may be computed. For example, the process 500 is described with respect to three heater power levels (0%, 50%, 100%). Thus, at the operation 525, the decision logic circuit 320 may compute three sum-of-square errors—one for each of the 0%, 50%, and 100% power levels. At operation 530, the decision logic circuit 320 identifies the minimum value amongst all of the computed sum-of-squares error values. For example, the decision logic circuit 320 may compare the three sum-of-squares error values computed at the operation 525 and select the minimum sum-of-squares error value.

The decision logic circuit 320 also determines, at operation 535, whether multiple sum-of-square error values correspond to the minimum sum-of-square error value. For example, if the sum-of-squares error values for the second power level (e.g., 50%) and for the third power level (e.g., 100%) are same and both are less than the sum-of-square error value associated with the first power level (e.g., 0%), at the operation 530, the decision logic circuit 320 may select the sum-of-squares error values for both the second power level and the third power level as the minimum sum-of-squares error value at the operation 530. Thus, there are two minimum sum-of-squares error values, which need further resolution to select one power level for the next time step. Upon finding multiple minimum sum-of-squares error values, the process 500 proceeds to operation 540 at which the decision logic circuit 320 computes a difference between the predicted temperature of the exhaust gas at the outlet of the heater 165 (e.g., as computed at the operation 515) and the target temperature at the inlet of the SCR system 130 for the power levels corresponding to the minimum sum-of-squares error values. For example, and continuing with the example above, if the minimum sum-of-squares error values correspond to the second (e.g., 50%) and third (e.g., 100%) power levels of the heater 165, at the operation 540, the difference is computed between the second gas temperature output 350B (e.g., for 50% heater power level) and the target temperature, and between the third gas temperature output 350N (e.g., for 100% heater power level) and the target temperature. The target temperature used in the computation of the operation 540 is same as the target temperature used in the computation of the operation 525.

Upon computing the difference values, at operation 545, the power level corresponding to the minimum of the two difference values is selected. For example, if the third heater power level (e.g., 100% heater power level) is the minimum of the computed difference values, the decision logic circuit 320 selects the third power level at the operation 545. At operation 550, the feedforward controller 300 adjusts the operation of the heater 165 to the selected power level to achieve the target temperature of the exhaust gas at the inlet of the SCR system 130 by the end of the forecast window. For example, if the heater 165 is currently set to 50% power level, upon selecting the 100% power level at the operation 545, the feedforward controller 300 may increase the power of the heater 165 to be at 100%. In some embodiments, the heater 165 may already be at 100% power when the selection of the operation 545 is made. In such cases, the feedforward controller 300 may continue to operate the heater 165 at the 100% power level. By continuously selecting an appropriate power level of the heater 165 and adjusting the operation of the heater 165 based on the selected power level, the feedforward controller 300 achieves and maintains the target temperature of the exhaust gas at the inlet of the SCR system 130 without undershooting or overshooting the target temperature.

On the other hand, if at the operation 535, the decision logic circuit 320 determines that there is a single minimum sum-of-squares error values, the process 500 proceeds to operation 555. At the operation 555, the decision logic circuit 320 selects the power level corresponding to the minimum sum-of-squares error value, and at the operation 550, the feedforward controller 300 adjusts the operation of the heater with the selected heater power level.

Upon adjusting the operation of the heater 165, the feedforward controller 300 may also determine if the time period of the forecast window is to be changed. As discussed above, the forecast window may be static (e.g., fixed) or dynamic. If the forecast window is fixed, no changes to the time period of the forecast window are needed and the process 500 ends at operation 565. If the forecast window is dynamic, at operation 570, the time period for the next forecast window is determined. As discussed above, the time period for the forecast window may be computed based on a sum of a calibrated length of time (e.g., 0.2 seconds) and the delay time calculated as part of predicting the temperature of the exhaust gas at the inlet of the SCR system 130 at the operation 520. Based on the sum, the time period for the next forecast window may be adjusted. The process 500 ends at the operation 565. The process 500 may be repeated in each time step for the forecast window computed in the previous time step (e.g., for a dynamic forecast window).

Figure 6:
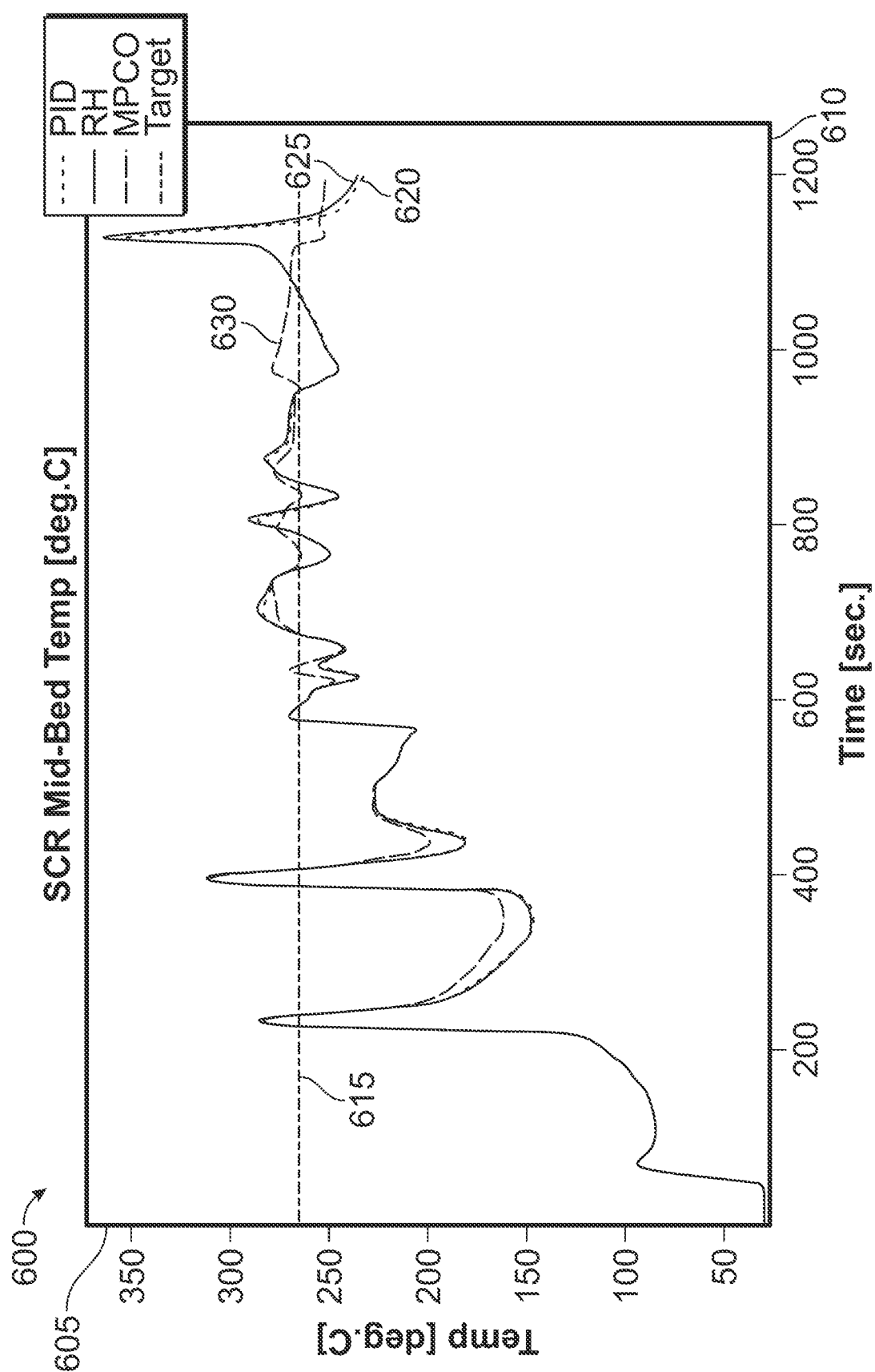
FIGS. 6-8E are example graphs comparing operation of the feedback controller with the feedforward controller, in accordance with some embodiments of the present disclosure.

Turning now to FIGS. 6-8E, various performance plots comparing a Proportional Integral Derivative (PID) type of feedback controller, a feedforward controller (also referred to a Model Predictive Controller or MPC), and a Relay Hysteresis (RH) type of feedback controller are shown, in accordance with some embodiments of the present disclosure. Referring specifically to FIG. 6, an example graph 600 plotting temperature on Y-axis 605 against time on X-axis 610 is shown. The graph 600 also shows a target temperature 615 of the exhaust gas at the inlet of the SCR system 130. The graph 600 is for a Cold Federal Transient Protocol (FTP) cycle. The graph 600 shows a first plot 620 corresponding to a PID controller, a second plot 625 corresponding to an RH controller, and a third plot 630 corresponding to an MPC controller. As shown in the graph 600, as time increases, the third plot 630 maintains the temperature of the exhaust gas at the inlet of the SCR system 130 closer to the target temperature 615 without the overshoots and the undershoots of the first plot 620 and the second plot 625.

Figure 7A:
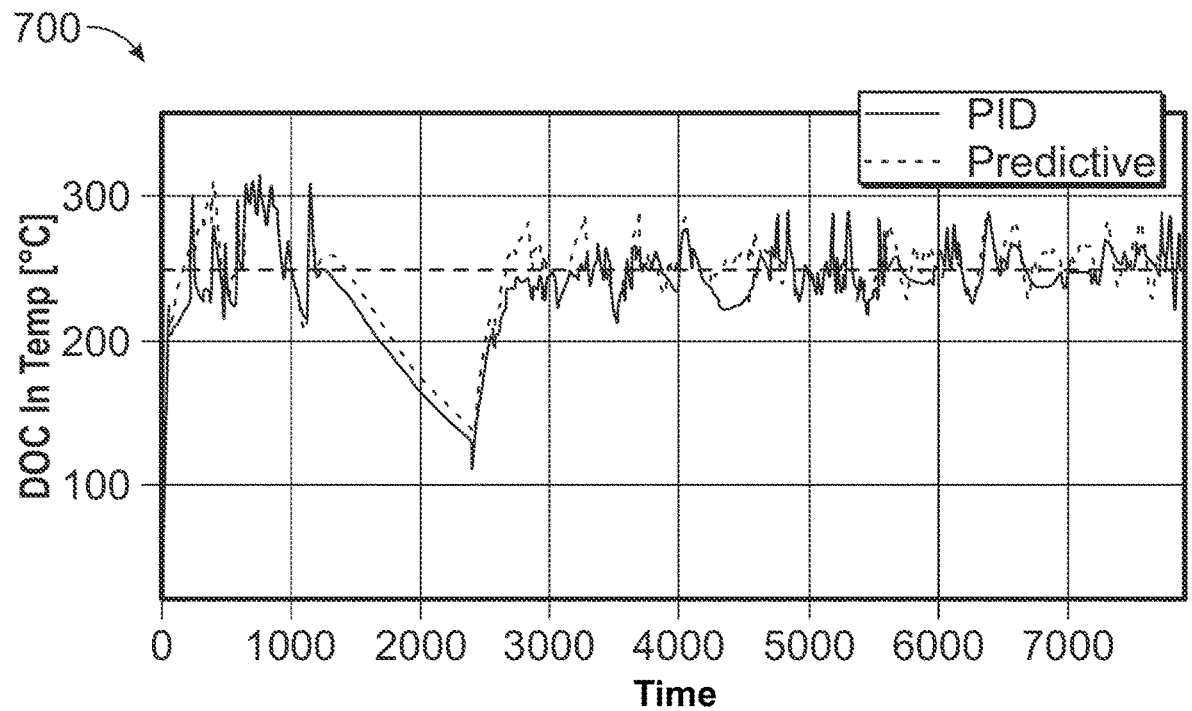
Figure 7B:
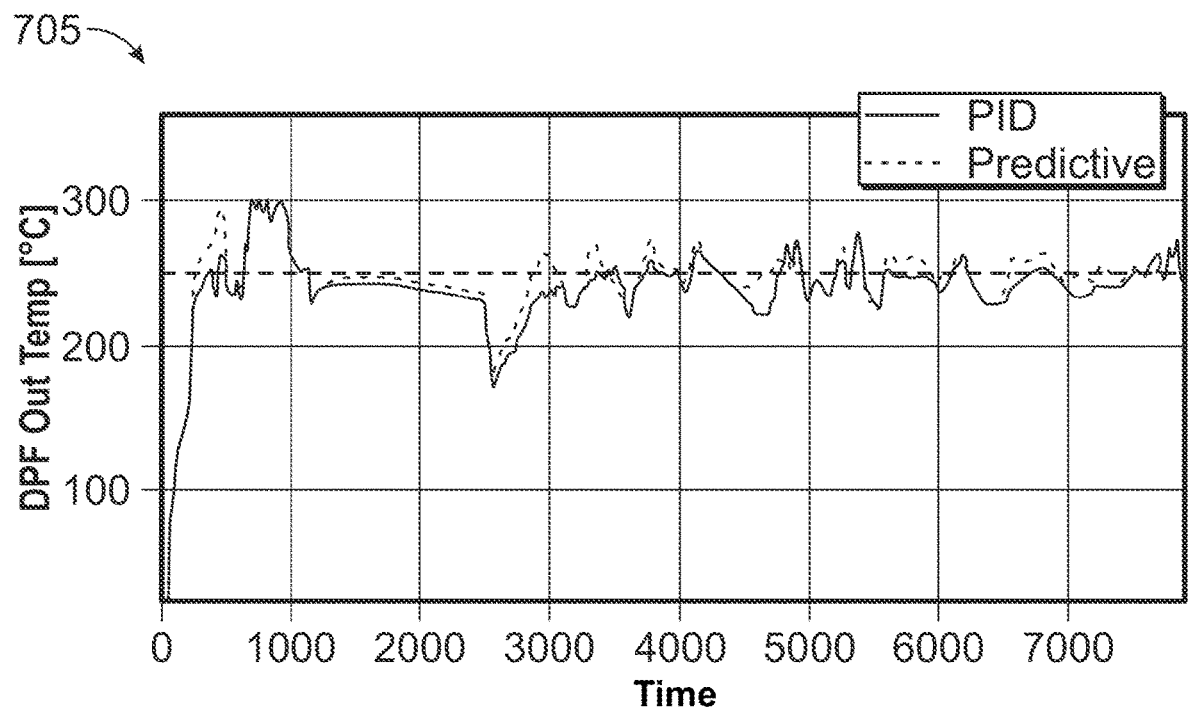
Figure 7C:
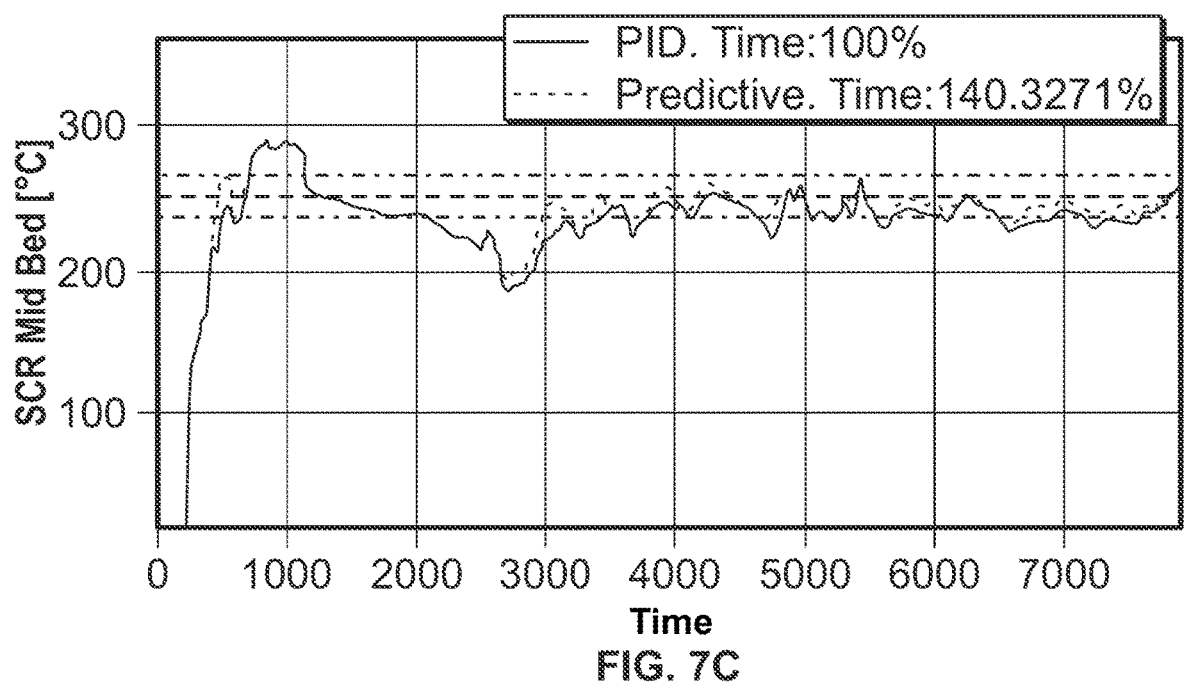
Figure 7D:
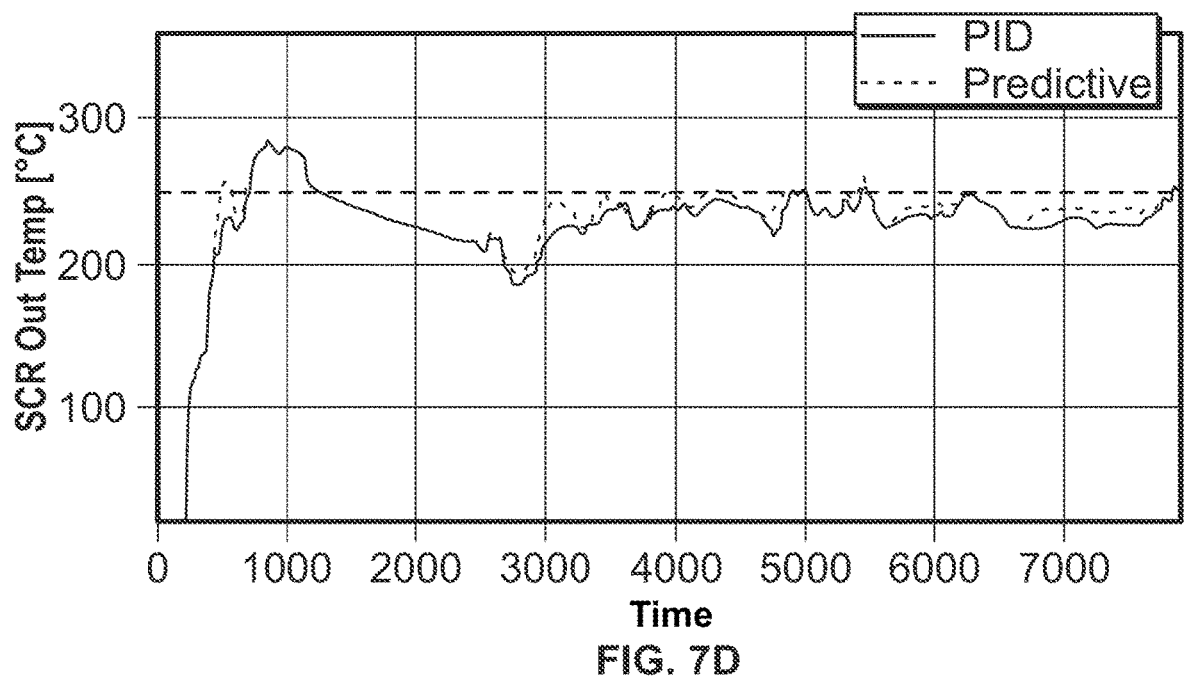
Figure 7E:
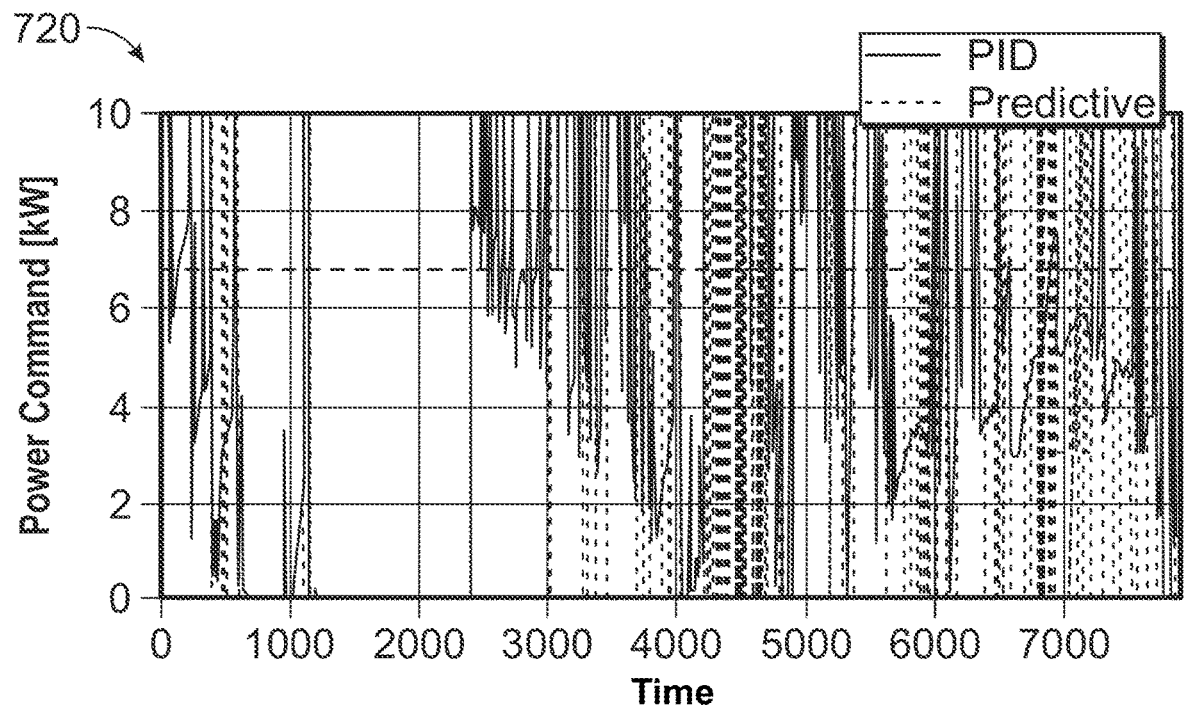

FIGS. 7A-7E show a plurality of graphs 700-720, with each of the graphs comparing a feedback controller (e.g., noted as "PID" in the graphs) with a feedforward controller (e.g., noted as "predictive" in the graphs) for a low load cycle (LLC) operation. The graphs 700-720 compare the temperature or power of the exhaust gas at various locations of the aftertreatment system 100 against time. For example, the graph 700 of FIG. 7A plots the temperature of the exhaust gas at the inlet of the DOC 120 against time, the graph 705 of FIG. 7B plots the temperature of the exhaust gas at the outlet of the DPF against time, the graph 710 of FIG. 7C plots the temperature of the exhaust gas at the axial length of the SCR catalyst 155 associated with the "midbed" region against time, the graph 715 of FIG. 7D plots the temperature of the exhaust gas at the outlet of the SCR system 130 against time, while the graph 720 of FIG. 7E plots the variations in the heater power level of the heater 165 against time. Thus, the feedforward and feedback controller may be used to adjust the temperature of the exhaust gas at other locations as well. Each of the graphs 700-715 compares the operation of the feedback controller with the operation of a feedforward controller against a target or target temperature. As seen from the graphs 700-715, the operation of the feedforward controller may be similar to or better than the operation of the feedback controller in achieving and/or maintaining the desired target temperature.

Figure 8A:
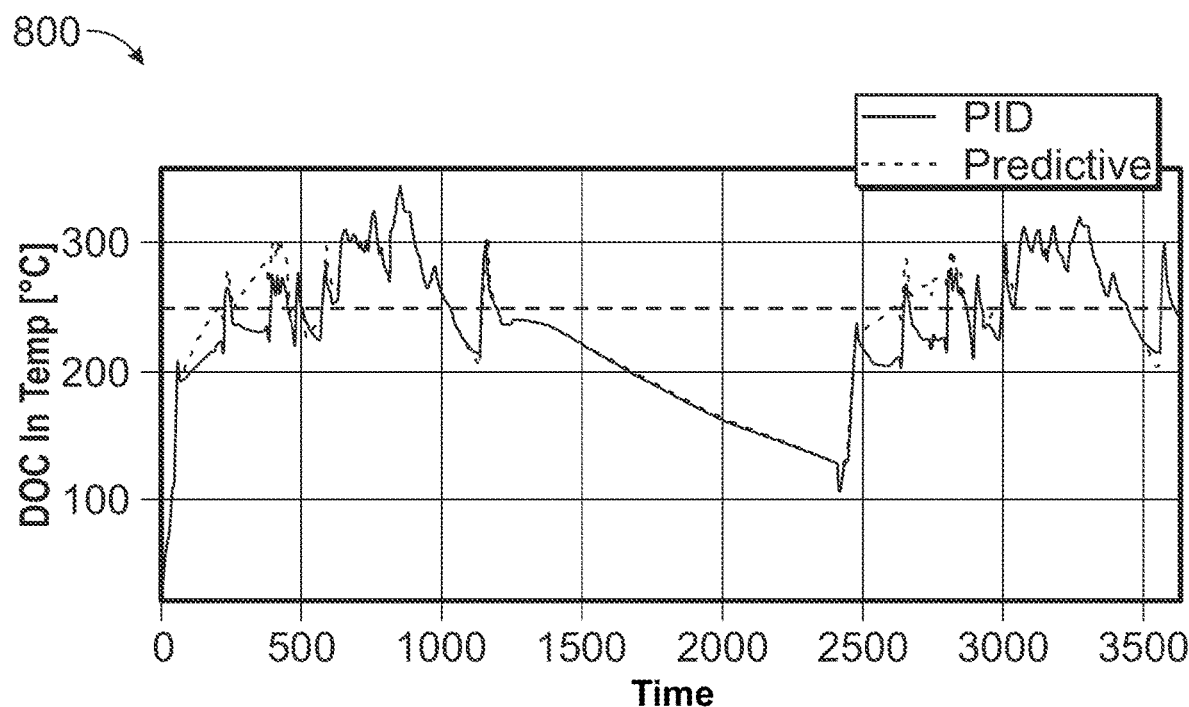
Figure 8B:
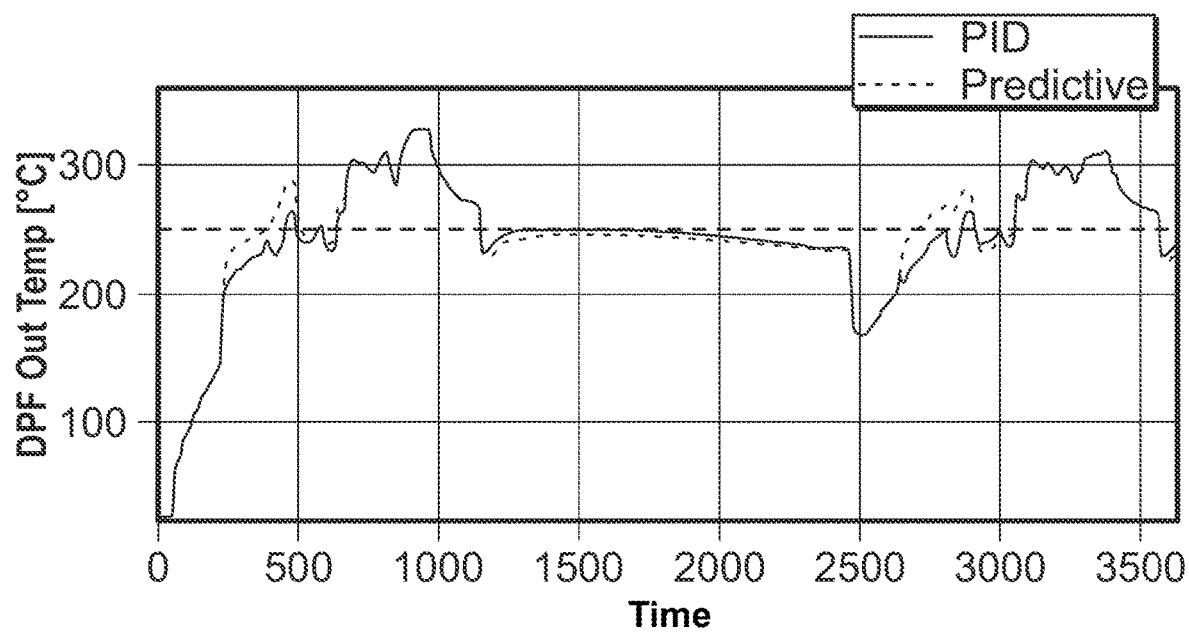
Figure 8C:
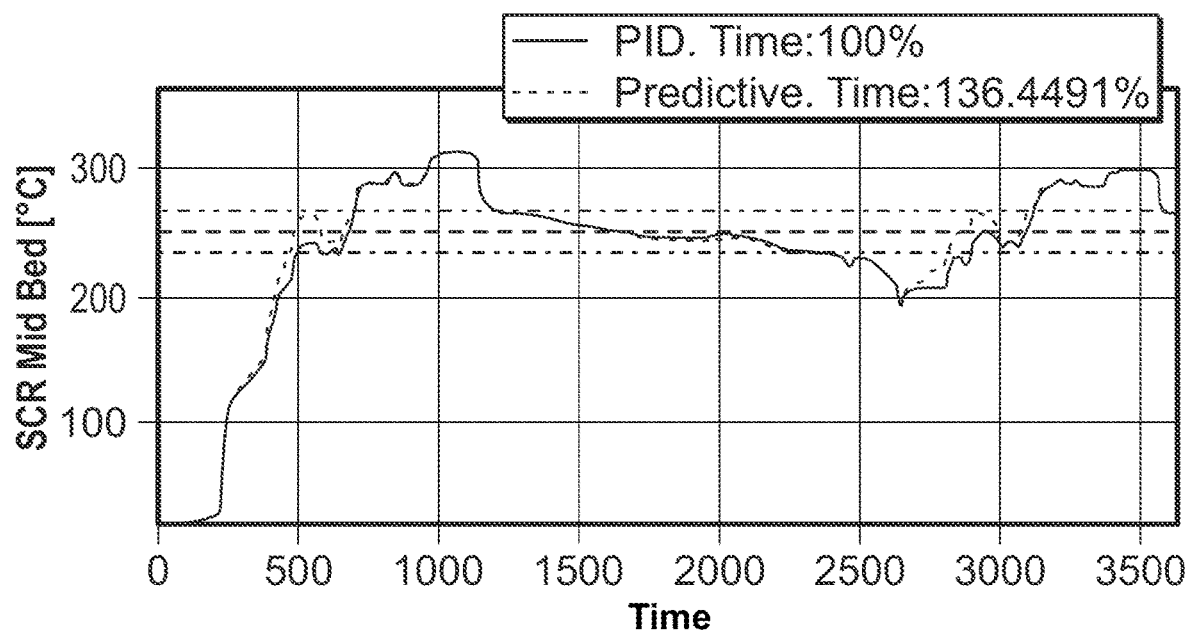
Figure 8D:
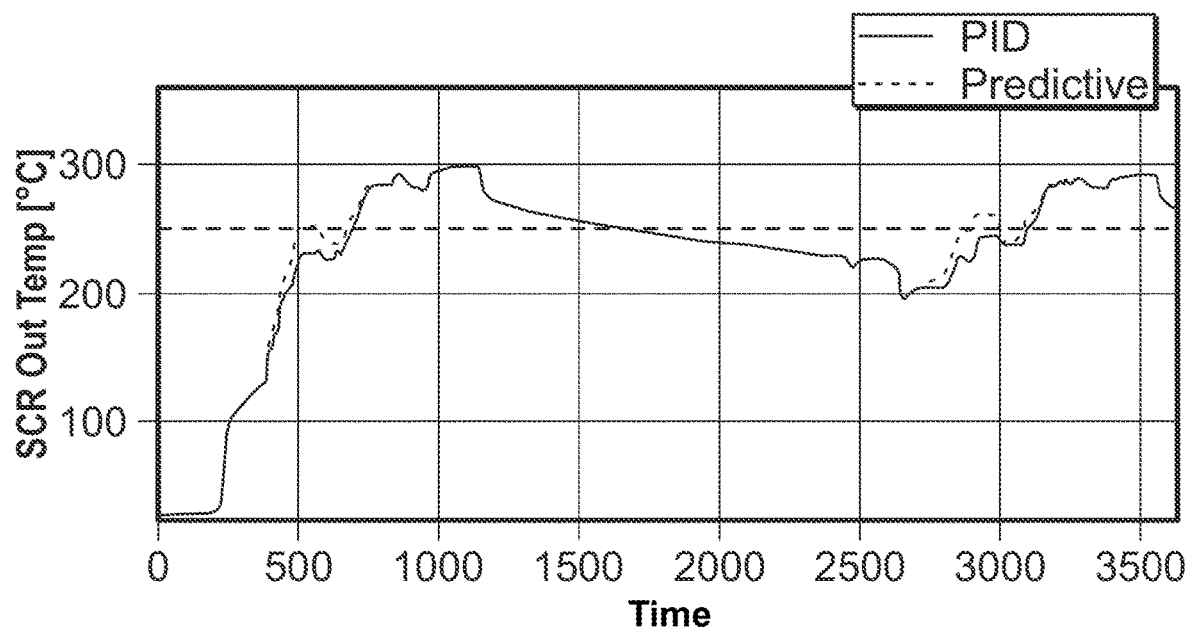
Figure 8E:
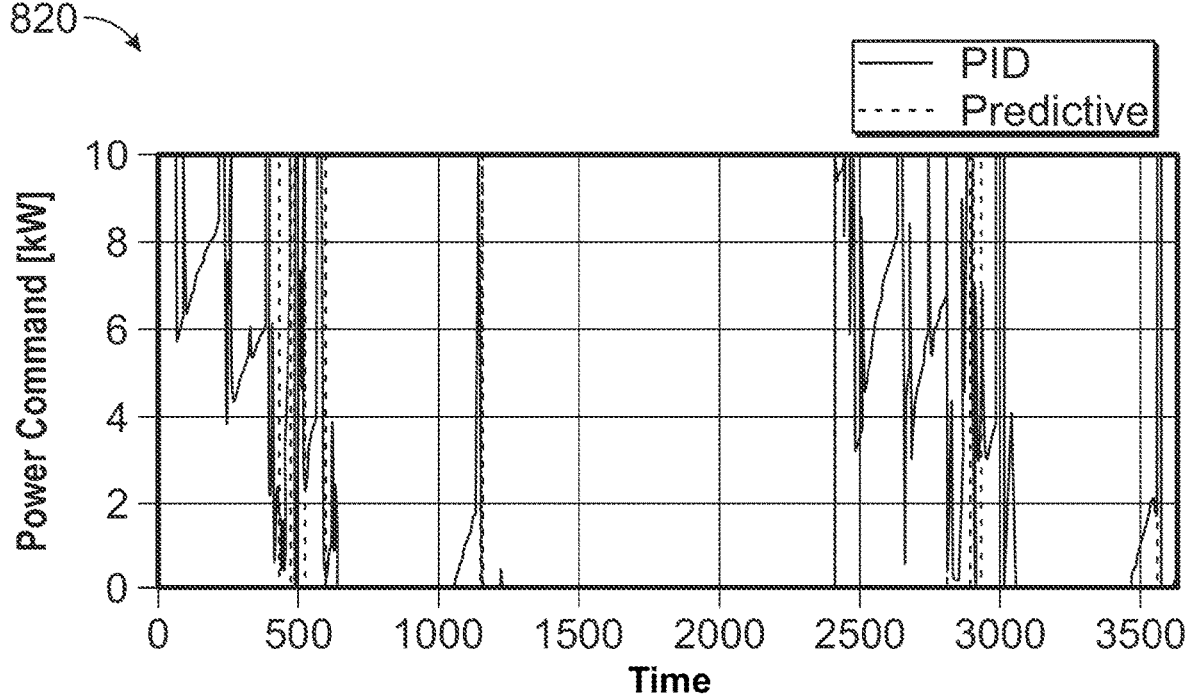

FIGS. 8A-8E show a plurality of graphs 800-820, with each of the graphs comparing a feedback controller (e.g., noted as "PID" in the graphs) with a feedforward controller (e.g., noted as "predictive" in the graphs) for a cold FTP plus hot FTP cycle operation. The graphs 800-820 compare the temperature or power of the exhaust gas at various locations of the aftertreatment system 100 against time. For example, the graph 800 of FIG. 8A plots the temperature of the exhaust gas at the inlet of the DOC 120 against time, the graph 805 of FIG. 8B plots the temperature of the exhaust gas at the outlet of the DPF against time, the graph 810 of FIG. 8C plots the temperature of the exhaust gas at the axial length of the SCR catalyst 155 associated with the "mid-bed" region against time, the graph 815 of FIG. 8D plots the temperature of the exhaust gas at the outlet of the SCR system 130 against time, while the graph 820 of FIG. 8E plots the variations in the heater power level of the heater 165 against time. Each of the graphs 800-815 compares the operation of the feedback controller with the operation of a feedforward controller against a target or target temperature. As seen from the graphs 800-815, the operation of the feedforward controller may be similar to or better than the operation of the feedback controller in achieving and/or maintaining the desired target temperature.

Thus, in some embodiments, the present disclosure discloses an aftertreatment system. The aftertreatment system includes a selective catalytic reduction (SCR) system, a heater, and a controller having a processor programmed to execute computer-readable instructions stored in a memory to determine a rise in temperature of exhaust gas at an outlet of the heater for a plurality of power levels of the heater, predict a first temperature of the exhaust gas at the outlet of the heater based on the rise in temperature for each of the plurality of power levels, and predict a second temperature of the exhaust gas at a location of the SCR system based on the first temperature for each of the plurality of power levels. The location of the SCR system includes an inlet of the SCR system or a defined axial location of the SCR system. The processor also executes computer-readable instructions to compare the second temperature for each of the plurality of power levels with a target temperature of the exhaust gas at the location of the SCR system, select one of the plurality of power levels based on the comparison, and adjust operation of the heater based on the selected one of the plurality of power levels to achieve the target temperature of the exhaust gas at the location of the SCR system.

In some embodiments, the present disclosure discloses another aftertreatment system having a selective catalytic reduction (SCR) system, a heater, and a controller having a processor programmed to execute computer-readable instructions stored in a memory to determine a first temperature of exhaust gas at a location of the SCR system. The location of the SCR system includes an inlet of the SCR system or a defined axial location of the SCR system. The processor also executes computer-readable instructions to determine a second temperature of the exhaust gas at an outlet of the heater, compare the first temperature with a target temperature of the exhaust gas at the location of the SCR system, and adjust operation of the heater based on the comparison and the second temperature to achieve the target temperature of the exhaust gas at the location of the SCR system.

In some embodiments, the present disclosure discloses yet another aftertreatment system. The aftertreatment system includes a selective catalytic reduction (SCR) system, an oxidation catalyst, and a controller including a processor programmed to execute computer-readable instructions stored in a memory to determine a first temperature of exhaust gas at a location of the SCR system. The location of the SCR system includes an inlet of the SCR system or a defined axial location of the SCR system. The processor also executes computer-readable instructions to determine a second temperature of the exhaust gas at an outlet of the oxidation catalyst, compare the first temperature with a target temperature of the exhaust gas at the location of the SCR system, and insert hydrocarbon into the oxidation catalyst based on the comparison and the second temperature to achieve the target temperature of the exhaust gas at the location of the SCR system.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

As used herein, the term "about" generally mean plus or minus 10% of the stated value. For example, about 0.5 would include 0.45 and 0.55, about 10 would include 9 to 11, about 1000 would include 900 to 1100.

The term "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present embodiments.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An aftertreatment system comprising:
a selective catalytic reduction (SCR) system;
a heater; and
a controller comprising a processor programmed to execute computer-readable instructions stored in a memory to:
determine a rise in temperature of exhaust gas at an outlet of the heater for a plurality of power levels of the heater;
predict a first temperature of the exhaust gas at an outlet of the heater based on the rise in temperature for each of the plurality of power levels;
predict a second temperature of the exhaust gas at a location of the SCR system based on the first temperature for each of the plurality of power levels, wherein the location of the SCR system comprises an inlet of the SCR system or a defined axial location of the SCR system;
compare the second temperature for each of the plurality of power levels with a target temperature of the exhaust gas at the location of the SCR system by computing a sum-of-squares error value between the second temperature of each of the plurality of power levels and the target temperature of the exhaust gas at the location of the SCR system;
select one of the plurality of power levels based on the comparison; and
adjust operation of the heater based on the selected one of the plurality of power levels to achieve the target temperature of the exhaust gas at the location of the SCR system.

2. The aftertreatment system of claim 1, wherein the processor is further programmed to execute computer-readable instructions to:
select one of the plurality of power levels by:
determining a minimum value from the sum-of-squares error values corresponding to the plurality of power levels, and
selecting a power level corresponding to the minimum value as the selected one of the plurality of power levels.

3. The aftertreatment system of claim 2, wherein the processor is further programmed to execute computer-readable instructions to:
determine that more than one value of the sum-of squares error values corresponds to the minimum value;
compute a difference between the second temperature corresponding to each of the more than one value of the sum-of squares error values that corresponds to the minimum value and the target temperature; and
select the power level of the heater corresponding to a minimum difference between the second temperature and the target temperature.

4. The aftertreatment system of claim 1, wherein the rise in temperature of the exhaust gas at the outlet of the heater is based on a power level of the heater, a mass flow rate of the exhaust gas, and a heat capacity of the exhaust gas.

5. The aftertreatment system of claim 1, wherein the determination of the rise in temperature of exhaust gas at the outlet of the heater, the prediction of the first temperature, the prediction of the second temperature, the comparison of the second temperature with the target temperature, the selection one of the plurality of power levels, and the adjustment of the operation of the heater is repeated in each of a plurality of steps to make predictions for a forecast window.

6. The aftertreatment system of claim 1, further comprising
an oxidation catalyst, wherein the
processor is further programmed to execute computer-readable instructions to:
determine a third temperature of the exhaust gas at an outlet of the oxidation catalyst;
compare the second temperature with the target temperature of the exhaust gas at the location of the SCR system; and
insert hydrocarbons into the oxidation catalyst based on the comparison and the third temperature to achieve the target temperature of the exhaust gas at the location of the SCR system.

7. The aftertreatment system of claim 1, wherein the heater is an electric heater.

8. An aftertreatment system comprising:
a selective catalytic reduction (SCR) system;
a heater; and
a controller comprising a processor programmed to execute computer-readable instructions stored in a memory to:
determine a first temperature of exhaust gas at a location of the SCR system, wherein the location of the SCR system comprises an inlet of the SCR system or a defined axial location of the SCR system;
determine a second temperature of the exhaust gas at an outlet of the heater;
compare the first temperature with a target temperature of the exhaust gas at the location of the SCR system by computing a sum-of-squares error value between the first temperature of each of the plurality of power levels and the target temperature of the exhaust gas at the location of the SCR system; and
adjust operation of the heater based on the comparison and the second temperature to achieve the target temperature of the exhaust gas at the location of the SCR system.

9. The aftertreatment system of claim 8, wherein the controller is a feedforward controller, and wherein the processor is further programmed to execute computer-readable instructions to:
predict the second temperature of the exhaust gas at the outlet of the heater based on a rise in temperature of the exhaust gas at the outlet of the heater for a plurality of power levels; and
predict the first temperature of the exhaust gas at the location of the SCR system based on the second temperature for each of the plurality of power levels.

10. The aftertreatment system of claim 9, wherein the processor is further programmed to execute computer-readable instructions to predict the rise in temperature of the exhaust gas at the outlet of the heater based on a power level of the heater, a mass flow rate of the exhaust gas, and a heat capacity of the exhaust gas.

11. The aftertreatment system of claim 8, wherein the processor is further programmed to execute computer-readable instructions to:

select one of the plurality of power levels to adjust the operation of the heater by:
    determining a minimum value from the sum-of-squares error values corresponding to the plurality of power levels, and
    selecting a power level corresponding to the minimum value as the selected one of the plurality of power levels.

12. The aftertreatment system of claim 11, wherein the processor is further programmed to execute computer-readable instructions to:
    determine that more than one value of the sum-of squares error values corresponds to the minimum value;
    compute a difference between the second temperature corresponding to each of the more than one value of the sum-of squares error values that corresponds to the minimum value and the target temperature; and
    select the power level of the heater corresponding to a minimum difference between the second temperature and the target temperature.

13. The aftertreatment system of claim 8, wherein the determination of the first temperature, the determination of the second temperature, the comparison of the first temperature with the target temperature, and the adjustment of the operation of the heater is repeated in each of a plurality of steps to make predictions for a forecast window.

* * * * *